United States Patent
Horgan et al.

(10) Patent No.: US 9,173,423 B2
(45) Date of Patent: *Nov. 3, 2015

(54) ANIMAL FOOD KIBBLE WITH ELECTROSTATICALLY ADHERED DUSTING

(75) Inventors: Monika Barbara Horgan, Oxford, OH (US); Gregory Dean Sunvold, Lewisburg, OH (US); Stephen Robert Glassmeyer, Cincinnati, OH (US); Patrick Joseph Corrigan, Glendale, OH (US); Michelle Marie Houston, West Chester, OH (US)

(73) Assignee: The Iams Company, McLean, VA (US)

( * ) Notice: Subject to any disclaimer, the term of this patent is extended or adjusted under 35 U.S.C. 154(b) by 689 days.

This patent is subject to a terminal disclaimer.

(21) Appl. No.: 12/533,042

(22) Filed: Jul. 31, 2009

(65) Prior Publication Data

US 2011/0027343 A1 Feb. 3, 2011

(51) Int. Cl.
 *A23K 1/00* (2006.01)
 *A23K 1/16* (2006.01)
 *A61K 35/741* (2015.01)
 *A23K 1/18* (2006.01)

(52) U.S. Cl.
 CPC .............. *A23K 1/1853* (2013.01); *A23K 1/004* (2013.01); *A23K 1/009* (2013.01)

(58) Field of Classification Search
 None
 See application file for complete search history.

(56) References Cited

U.S. PATENT DOCUMENTS

| | | | |
|---|---|---|---|
| 4,088,796 A | 5/1978 | Persson | |
| 4,273,788 A | 6/1981 | Bone et al. | |
| 4,870,059 A | 9/1989 | Mitsuhashi et al. | |
| 4,927,763 A | 5/1990 | Sudoma et al. | |
| 4,956,295 A | 9/1990 | Sudoma | |
| 5,085,874 A | 2/1992 | Jungvid | |
| 5,147,668 A | 9/1992 | Munk | |
| 5,283,059 A | 2/1994 | Suzuki et al. | |
| 5,478,570 A | 12/1995 | Sunohara et al. | |
| 5,480,641 A | 1/1996 | Casas-Perez | |
| 5,505,969 A | 4/1996 | Wood et al. | |
| 5,603,974 A | 2/1997 | Wood et al. | |
| 5,883,161 A | 3/1999 | Wood et al. | |
| 5,968,569 A | 10/1999 | Cavadini et al. | |
| 6,010,725 A | 1/2000 | Meister ET AL | |
| 6,042,857 A | 3/2000 | Jones et al. | |
| 6,063,414 A | 5/2000 | Jones et al. | |
| 6,117,477 A | 9/2000 | Paluch | |
| 6,132,786 A | 10/2000 | Poulos et al. | |
| 6,150,004 A | 11/2000 | Oikawa et al. | |
| 6,200,609 B1 | 3/2001 | Meister et al. | |
| 6,218,013 B1 | 4/2001 | Wood et al. | |
| 6,254,910 B1 | 7/2001 | Paluch | |
| 6,312,746 B2 | 11/2001 | Paluch | |
| 6,827,957 B2 | 12/2004 | Paluch et al. | |
| 7,037,708 B1 * | 5/2006 | Runge et al. | 435/243 |
| 7,067,150 B2 | 6/2006 | Farber et al. | |
| 7,189,390 B2 | 3/2007 | Zink et al. | |
| 7,211,280 B1 | 5/2007 | Young et a | |
| 7,229,818 B2 | 6/2007 | Porubcan | |
| 7,318,920 B2 | 1/2008 | Christensen | |
| 7,381,406 B2 | 6/2008 | Zink et al. | |
| 7,479,286 B2 | 1/2009 | Couzy et al. | |
| 7,479,294 B2 | 1/2009 | Sokhey et al. | |
| 7,547,527 B2 | 6/2009 | Baur et al. | |
| 2003/0077356 A1 | 4/2003 | Campbell et al. | |
| 2003/0175387 A1 | 9/2003 | English | |
| 2003/0190309 A1 | 10/2003 | Zink et al. | |
| 2003/0215547 A1 | 11/2003 | Leyh | |
| 2004/0047896 A1 | 3/2004 | Malnoe et al. | |
| 2004/0115308 A1 | 6/2004 | Bengtsson-Riveros et al. | |
| 2004/0166206 A1 | 8/2004 | Archibald et al. | |
| 2004/0175389 A1 | 9/2004 | Porubcan | |
| 2005/0060707 A1 | 3/2005 | Tunney | |
| 2005/0064073 A1 | 3/2005 | Paluch et al. | |
| 2005/0079244 A1 | 4/2005 | Giffard et al. | |
| 2005/0092116 A1 | 5/2005 | Pachov | |
| 2005/0100559 A1 | 5/2005 | Myatt et al. | |
| 2005/0106132 A1 | 5/2005 | Porubcan | |
| 2005/0106133 A1 | 5/2005 | Zink et al. | |
| 2005/0147649 A1 | 7/2005 | Perez et al. | |
| 2005/0147651 A1 | 7/2005 | Scherl et al. | |
| 2005/0152884 A1 | 7/2005 | Boileau et al. | |
| 2005/0153018 A1 | 7/2005 | Ubbink et al. | |
| 2005/0158291 A1 | 7/2005 | Breton | |

(Continued)

FOREIGN PATENT DOCUMENTS

| DE | 10 204 008085 | 9/2005 |
|---|---|---|
| EP | 01036512 A1 | 9/2000 |

(Continued)

OTHER PUBLICATIONS

Article: "The Use of Probiotics in the Diet of Dogs" —American Society for Nutritional Sciences. Journal of Nutrition 128: 2730S-2732S, 1998.

(Continued)

*Primary Examiner* — Kevin S Orwig

(74) *Attorney, Agent, or Firm* — Tracey S. Truitt; Kelley A. Schnieders; Polsinelli PC

(57) ABSTRACT

A method of providing an animal food having an active. A Probiotic animal food having a low water activity that can be contained within a package having a low vapor transmission rate. The animal food can have a shelf life sufficient to deliver a target dose of Probiotic to an animal. The water activity of the animal food can be controlled. The activity level of the Probiotic can be controlled.

17 Claims, 5 Drawing Sheets

(56) References Cited

U.S. PATENT DOCUMENTS

| | | |
|---|---|---|
| 2005/0158293 A1 | 7/2005 | Boileau et al. |
| 2005/0158294 A1 | 7/2005 | Boileau et al. |
| 2005/0175598 A1 | 8/2005 | Boileau et al. |
| 2005/0214420 A1 | 9/2005 | Schmidt et al. |
| 2005/0266069 A1 | 12/2005 | Simmons et al. |
| 2005/0281910 A1 | 12/2005 | Schiffrin et al. |
| 2006/0099321 A1 | 5/2006 | Sievert ET AL |
| 2006/0228448 A1 | 10/2006 | Boileau et al. |
| 2006/0263416 A1 | 11/2006 | Brent |
| 2006/0269534 A1 | 11/2006 | Boileau et al. |
| 2006/0270020 A1 | 11/2006 | Boileau et al. |
| 2007/0059297 A1 | 3/2007 | Waldron et al. |
| 2007/0098744 A1 | 5/2007 | Knorr et al. |
| 2007/0160589 A1 | 7/2007 | Mattson |
| 2007/0178079 A1 | 8/2007 | Zink et al. |
| 2007/0202087 A1 | 8/2007 | Baillon et al. |
| 2007/0218164 A1 | 9/2007 | Stojanovic |
| 2007/0251465 A1 | 11/2007 | Shafer et al. |
| 2007/0269553 A1 | 11/2007 | Le et al. |
| 2008/0026063 A1 | 1/2008 | Ueda et al. |
| 2008/0057169 A1 | 3/2008 | Archibald et al. |
| 2008/0095752 A1 | 4/2008 | Chiang et al. |
| 2008/0145341 A1 | 6/2008 | Myatt et al. |
| 2008/0171106 A1 | 7/2008 | Zink et al. |
| 2008/0213431 A1 | 9/2008 | Connolly et al. |
| 2008/0220126 A1 | 9/2008 | Boileau et al. |
| 2008/0248156 A1 | 10/2008 | Boileau et al. |
| 2008/0260893 A1 | 10/2008 | Giffard et al. |
| 2008/0280274 A1 | 11/2008 | Friesen et al. |
| 2008/0305094 A1 | 12/2008 | Pridmore-Merten |
| 2008/0305210 A1 | 12/2008 | Petersen |
| 2008/0311226 A1 | 12/2008 | Yamka et al. |
| 2008/0317905 A1 | 12/2008 | Yamka et al. |
| 2009/0017130 A1 | 1/2009 | Yamka et al. |
| 2009/0017163 A1 | 1/2009 | Garbolino et al. |
| 2009/0136163 A1 | 5/2009 | Kerr et al. |
| 2010/0266727 A1 | 10/2010 | Swaminathan et al. |

FOREIGN PATENT DOCUMENTS

| | | | |
|---|---|---|---|
| EP | 1932432 A1 | 6/2008 | |
| GB | 2205476 A | 12/1988 | |
| JP | 57206338 A2 | 12/1982 | |
| JP | 6040464 A2 | 2/1994 | |
| JP | 6040472 A2 | 2/1994 | |
| RU | 2251364 | 5/2005 | |
| WO | WO 89/05849 A1 | 6/1989 | |
| WO | WO 95/07090 | 3/1995 | |
| WO | WO 95/17103 A1 | 6/1995 | |
| WO | WO 95/34214 A1 | 12/1995 | |
| WO | WO 97/16077 A1 | 5/1997 | |
| WO | WO 99/09839 A1 | 3/1999 | |
| WO | WO 00/041576 | 7/2000 | |
| WO | WO 2000/047062 A2 | 8/2000 | |
| WO | WO 01/017365 A1 | 3/2001 | |
| WO | WO 2003/018778 A2 | 3/2003 | |
| WO | WO 2004/074496 A1 | 9/2004 | |
| WO | WO 2005/047255 A1 | 5/2005 | |
| WO | WO 2005/070232 A1 | 8/2005 | |
| WO | WO 2005/092116 A1 | 10/2005 | |
| WO | WO 2006/007463 * | 1/2006 | A23L 1/30 |
| WO | WO 2006/064959 A1 | 6/2006 | |
| WO | WO 2006/122196 A2 | 11/2006 | |
| WO | WO 2006/124675 A2 | 11/2006 | |
| WO | WO 2007/048104 A1 | 4/2007 | |
| WO | WO 2007/051816 A1 | 5/2007 | |
| WO | WO 2007/060539 A2 | 5/2007 | |
| WO | WO 2007/044968 A3 | 6/2007 | |
| WO | WO 2007/077401 A1 | 7/2007 | |
| WO | WO 2007/079147 A2 | 7/2007 | |
| WO | WO 2007/126990 A2 | 11/2007 | |
| WO | WO 2008/035332 A1 | 3/2008 | |
| WO | WO 2008/046625 A2 | 4/2008 | |
| WO | WO 2007/126990 A3 | 6/2008 | |
| WO | WO 2008/076975 A1 | 6/2008 | |
| WO | WO 2008/090270 A1 | 7/2008 | |
| WO | WO 2008/092228 A1 | 8/2008 | |
| WO | WO 2008/101508 A1 | 8/2008 | |
| WO | WO 2008/112296 A1 | 9/2008 | |
| WO | WO 2008/131906 A2 | 11/2008 | |
| WO | WO 2009/061221 A2 | 5/2009 | |
| WO | WO 2009/061222 A2 | 5/2009 | |

OTHER PUBLICATIONS

PCT International Search Report dated Nov. 24, 2010—5 pgs.

* cited by examiner

Water activity change in presence of silica desiccant

ANIMAL FOOD KIBBLE WITH ELECTROSTATICALLY ADHERED DUSTING

FIELD

Embodiments of the present invention relate generally to the field of animal food. Embodiments of the present invention more particularly, but not exclusively, relate to pet food kibbles having a low water activity and having Probiotic microorganisms, wherein the pet food can be contained within a package having a low permeability.

BACKGROUND

Kibble-type animal feeds, such as dog and cat foods, are dried, ready-to-eat pet food products. The kibbles can be formed by an extrusion process where the kibble raw materials are extruded under heat and pressure to form the pelletized kibble form. Extrusion technology provides a cheap and efficient method for formulating animal feed kibbles, such as those having a starch matrix. During the extrusion process, the starch matrix typically becomes gelatinized under the extrusion conditions.

The defense mechanisms to protect the mammalian gastrointestinal (GI) tract from colonization by pathogenic bacteria are highly complex. The GI tracts of most mammals are colonized by native microflora and invasive pathogenic micro-organisms. In a healthy individual, these competing microflora are in a state of equilibrium. Modification of the intestinal microflora equilibrium can lead to or prevent many GI disorders, both in humans and other mammalian species, such as companion animals, including, for example, cats, dogs, and rabbits. The well being of companion animals is closely related to their feeding and GI health, and maintenance of the intestinal microflora equilibrium in these animals can result in healthier pets.

The number and composition of the intestinal microflora tend to be stable, although age and diet can modify it. Gastric activity, bile, intestinal peristalsis, and local immunity are factors thought to be important in the regulation of bacterial flora in the small intestine of human beings and various other mammals. Often, pet GI disorders, including those found in canines and felines, are linked to bacterial overgrowth and the production of enterotoxins by pathogenic bacteria. These factors disrupt the intestinal microflora equilibrium and can promote inflammation and aberrant immune response.

Research has begun to highlight some valuable strains of bacteria and their potential uses as Probiotic agents. Probiotics are typically considered to be preparations of live bacteria. Probiotic related substances include constituents of Probiotics, such as proteins or carbohydrates, or purified fractions of bacterial ferments. Probiotics and/or their constituents may promote mammalian health by preserving and/or promoting the natural microflora in the GI tract and reinforcing the normal controls on aberrant immune responses.

Thus, a desired goal of improving the health of companion animals by way of providing Probiotics to the animal exists. However, many of the ingredients can be costly, sensitive to effects of extrusion or other production methods, and/or sensitive to product stability, such as exposure to oxygen or moisture. Identifying new product forms and designs where these challenges are overcome would enable products to be made that satisfy the goal of consumers to provide improved health benefits to their companion animals. Thus, a need exists for improved kibble matrices and for Probiotic kibbles and kibble animal feeds for companion animals.

A manner of protecting these Probiotics, or even other active materials or ingredients, from decomposition, hydrolysis, or oxidation can include incorporating the active materials into the food product at a step in the manufacturing process following the heating of the primary nutritional ingredients. In most present forms, the active materials can be carried in a carrier agent and the carrier agent can serve as an oxygen and moisture barrier and can also provide stability to the active materials during any additional manufacture and storage of the food product. Common carrier agents can include fats, oils, and waxes.

Technical problems remain when utilizing carrier agents. Some of the technical problems when using a carrier agent include, but are not limited to, uneven coating, agglomeration of the food product, pelletization of the carrier agent, adhesion to the machinery, and combinations thereof. It would be desirable to develop pet food products comprising active materials, such as Probiotics, that eliminate or solve many or some of these technical problems.

Thus, one of the need areas includes the easy delivery of the Probiotic to the pet. As mentioned, many ways and product forms currently exist, including encapsulating the Probiotics, providing coatings of materials and mixing with the Probiotics, applying Probiotics to a coating on a kibble, and many others, some of which are highlighted in WO 2008/076975.

An easier and more cost-effective approach to providing Probiotics to animals using a kibble delivery form is needed.

SUMMARY

In one embodiment, a method of providing an animal food having an active ingredient is provided. The method can comprise providing a nutritionally balanced animal food comprising an active ingredient; providing a package having a permeability of no more than about $10^{-5}$ grams/day/cm$^2$/mmHg; and packing the animal food into the package. The animal food can a water activity of less than about 0.3 when packed, and the package can be effective at maintaining the activity of the active ingredient to no less than 90% of the initial activity level after 6 months of packing. A desiccant can also be provided within the package.

In one embodiment, a method of providing an animal food having a Probiotic is provided. The method can comprise providing a nutritionally balanced animal food comprising a Probiotic; providing a package having a permeability of no more than about $10^{-5}$ grams/day/cm$^2$/mmHg; and packing the animal food into the package. The animal food can have a water activity of less than about 0.3 when packed, and the package can be effective at preventing the Probiotic from losing more than two logs after 6 months of packing. A desiccant can also be provided within the package.

In one embodiment, a method is provided that can comprise providing an animal food comprising an active component; identifying a target dose level of the active component, wherein the active component is to be delivered to the animal through the animal food after a shelf life period at the target dose level; and determining a water activity of the animal food and at least one tolerance condition. The water activity and the tolerance condition can be determined and related such that the active component is capable of being delivered to the animal at the target dose level.

DETAILED DESCRIPTION

Definitions

Figure 1:
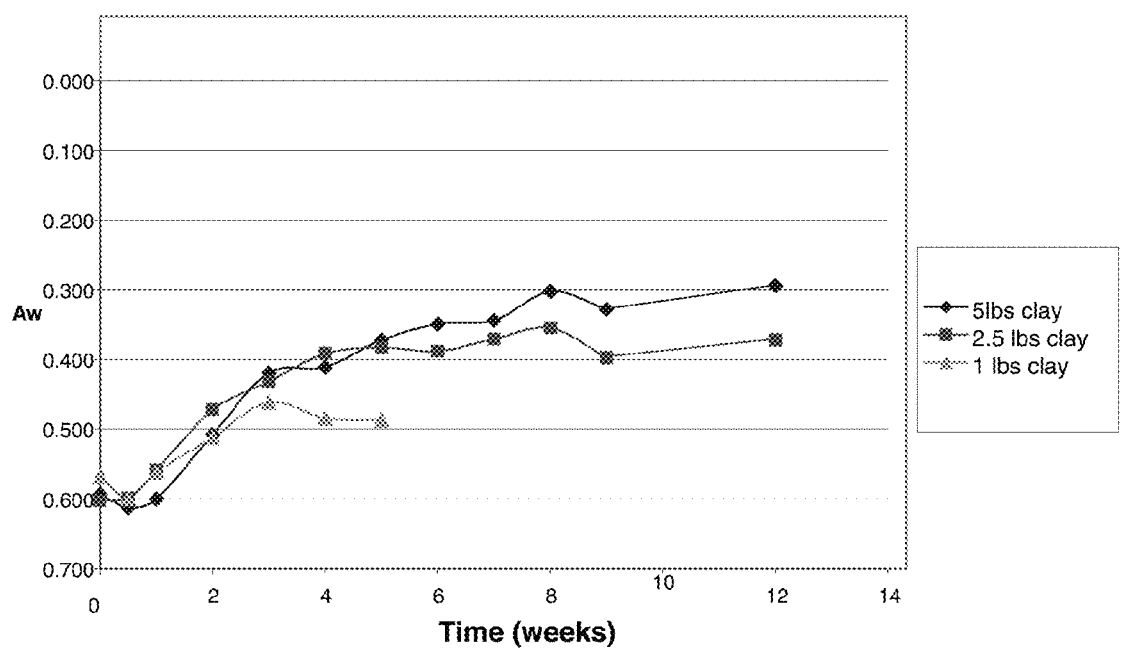
FIG. 1 shows the water activity (Aw) effect of using a desiccant in accordance with one embodiment of the present invention.

As used herein, the articles including "the", "a", and "an", when used in a claim or in the specification, are understood to mean one or more of what is claimed or described.

As used herein, the terms "include", "includes", and "including" are meant to be non-limiting.

As used herein, the term "plurality" means more than one.

As used herein, the term "micrometers" is synonymous with microns.

As used herein, the term "water activity" is defined as the vapor pressure of water above a sample, such as a pet food, divided by that of pure water at the same temperature and generally refers to the amount of free water available to participate in chemical reactions. Water activity is often times represented by the mathematical equation $a_w = p/p_0$, where p is the vapor pressure of water in the sample, and $p_0$ is the vapor pressure of pure water at the same temperature.

As used herein, the term "kibble" includes a particulate pellet like component of animal feeds, such as dog and cat feeds, typically having a moisture, or water, content of less than 12% by weight. Kibbles may range in texture from hard to soft. Kibbles may range in internal structure from expanded to dense. Kibbles may be formed by an extrusion process. The kibble can comprise a gelatinized starch matrix. The kibble can alternatively, or additionally, comprise a protein-based core matrix. Variations of the kibble are disclosed herein.

As used herein, the terms "animal" or "pet" mean a domestic animal including, but not limited to domestic dogs, cats, horses, cows, ferrets, rabbits, pigs, and the like. Domestic dogs and cats are particular examples of pets.

As used herein, the terms "animal feed", "animal feed compositions", "animal feed kibble", "pet food", or "pet food composition" all mean a composition intended for ingestion by a pet. Pet foods can include, without limitation, nutritionally balanced compositions suitable for daily feed, as well as supplements and/or treats, which can or may not be nutritionally balanced.

As used herein, the terms "Probiotic", "Probiotic component", "Probiotic ingredient, or "Probiotic microorganism" mean bacteria or other microorganisms, typically preparations of live bacteria, including those in the dormant state, that are capable of promoting mammalian health by preserving and/or promoting the natural microflora in the GI tract and reinforcing the normal controls on aberrant immune responses. Probiotics can include constituents of Probiotics, such as proteins or carbohydrates, or purified fractions of bacterial ferments.

As used herein, the term "nutritionally balanced" means that the composition, such as pet food, has known required nutrients to sustain life in proper amounts and proportion based on recommendations of recognized authorities, including governmental agencies, such as, but not limited to, United States Food and Drug Administration's Center for Veterinarian Medicine, the American Feed Control Officials Incorporated, in the field of pet nutrition, except for the additional need for water.

As used herein, the term "core", or "core matrix", means the particulate pellet of a kibble and is typically formed from a core matrix of ingredients and has a moisture, or water, content of less than 12% by weight. The particulate pellet may be dusted to form a dusting on a core, which can be a dusted kibble. The core may be without a dusting, may be with a dusting completely surrounding the core, or may be with a dusting partially surrounding the core. In an embodiment without a dusting, the particulate pellet may comprise the entire kibble. Cores can comprise farinaceous material, proteinaceous material, and mixtures and combinations thereof. In one embodiment, the core can comprise a core matrix of protein, carbohydrate, and fat.

As used herein, the term "coating" means a partial or complete covering, typically on a core, that covers at least a portion of a surface, for example a surface of a core. In one example, a core may be partially covered with a coating such that only part of the core is covered, and part of the core is not covered and is thus exposed. In another example, the core may be completely covered with a coating such that the entire core is covered and thus not exposed. Therefore, a coating may cover from a negligible amount up to the entire surface. A coating can also be coated onto other coatings such that a layering of coatings can be present. For example, a core can be completed coated with coating A, and coating A can be completely coated with coating B, such that coating A and coating B each form a layer. When used herein, unless specifically stated, a coating means a coating that comprises a Probiotic or other active. Thus, for example, an amount of fat that is normally enrobed or applied to a kibble would not be considered a coating within the present definition unless specifically provided for as a coating.

As used herein, the term "extrude" means an animal feed that has been processed by, such as by being sent through, an extruder. In one embodiment of extrusion, kibbles are formed by an extrusion processes wherein raw materials, including starch, can be extruded under heat and pressure to gelatinize the starch and to form the pelletized kibble form, which can be a core. Any type of extruder can be used, non-limiting examples of which include single screw extruders and twin-screw extruders.

As used herein, the terms "shelf stability" or "shelf life" means surviving conditions in a package wherein the active, such as a Probiotic, is not sufficiently activated such that the Probiotic microorganism is at or above a target dose level in the animal upon ingestion.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All lists of items, such as, for example, lists of ingredients, are intended to be lists of Markush groups. Thus, all lists can be read and interpreted as items "selected from the group consisting of" . . . list of items . . . "and combinations and mixtures thereof."

Referenced herein may be trade names for components including various ingredients utilized in the present disclosure. The inventors herein do not intend to be limited by materials under any particular trade name. Equivalent materials (e.g., those obtained from a different source under a different name or reference number) to those referenced by trade name may be substituted and utilized in the descriptions herein.

In the description of the various embodiments of the present disclosure, various embodiments or individual features are disclosed. As will be apparent to the ordinarily skilled practitioner, all combinations of such embodiments and features are possible and can result in preferred executions of the present disclosure. While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

As is well known in the art, Probiotics can provide prophylactic, therapeutic, and non-therapeutic treatment to alleviate diseases or health conditions or to enhance the overall health of animals. Probiotics can be delivered to animals through their source of nutrition, such as animal food. It has been determined that one of the barriers to overcome in providing Probiotics through animal food, and thus to provide the benefits of the Probiotic itself, is the high mortality of certain Probiotics in relatively high moisture and relatively high oxygen environments. Thus, many avenues of Probiotic protection have ensued and been developed.

Some embodiments of the present invention relate to a pet food composition having a Probiotic. The pet food composition can be at or below a critical water activity such that the activity of the Probiotic remains at desired levels. The pet food composition can be contained with a container. The container can have particular properties that aid in maintaining the desired levels of Probiotic activity. Optionally, a desiccant can be used to also aid in maintaining the desired levels of Probiotic activity. The pet food composition, container, and optionally a desiccant can together form an article of commerce, wherein the article of commerce can be effective at delivering a Probiotic-containing pet food composition having desired levels of Probiotic activity.

For stable Probiotics, the Probiotic microorganisms can be maintained in a dormant state until consumed by the animal. Stability of the Probiotic microorganisms can depend, at least in part, in one embodiment, on the ability of a coating, if used in one embodiment, to prevent or reduce water transmission. For example, water is an enabler of bacterial or microorganism growth. Thus, if the environment around the Probiotic microorganisms does not prevent or reduce the transmission of water, for example, from humidity or other sources, the Probiotic microorganisms may be exposed to water that may then cause the Probiotic microorganisms to come out of dormancy and begin growing. This initiated growth can be a concern, since the Probiotic microorganisms can only grow for a short period of time before they consume their available food supply and die. Death of the Probiotic microorganism results in a reduction of the activity of the Probiotic and reduction of the overall activity of the Probiotic animal feed composition. Thus, it can be advantageous for the environment of the Probiotic in one embodiment to have a sufficiently low water transmission character to prevent premature activation and growth of the Probiotic microorganism prior to consumption by the animal.

It has further been found that temperature affects the activity and thus shelf life of Probiotics, especially in the case of animal food containing Probiotics. Generally, as temperature increases, the water activity of the animal food containing Probiotics needs to be controlled such that it is at or below certain critical levels. Without being bound by theory, it is thought that moisture acts faster as temperature increases, and faster acting moisture can negatively affect the activity of Probiotics. Thus, in one embodiment of the present invention, a method of controlling the temperature, water activity, and humidity of an animal food containing Probiotics is disclosed, such as by using the articles of commerce and elements thereof as disclosed herein. This method, in one embodiment, can result in a desired shelf life of the animal food containing Probiotics.

Therefore, producing an animal feed kibble comprising an active ingredient, such as a Probiotic, may present specific formulation issues and difficulties. For example, when producing a kibble, such as a kibble with a Probiotic, the kibble and the resulting animal feed must have sufficient shelf life so that the Probiotic microorganims retain their activity upon sale to a consumer and consumption by an animal. Stability or activity of the Probiotic is therefore necessary from a consumer satisfaction standpoint and also from a regulatory standpoint. For example, the Probiotics can have sufficient stability such that they do not lose a noticeable amount of their Probiotic activity, for example, by the Probiotic microorganisms dying, between the time of formulation in the production facility and the time of consumption by the animal. If consumers do not notice or believe that the Probiotics are providing a benefit, then they will not purchase the product. In addition, certain governmental regulatory agencies require at least a certain amount of the Probiotics to be active if a product is labeled, guaranteed, or advertised as containing Probiotics and providing certain Probiotic produced health benefits. For at least these two reasons, Probiotics in food compositions must demonstrate acceptable stability.

Thus, articles of commerce, animal food compositions, packaging, methods of controlling water activity, methods of providing animal foods, processes of making, among other embodiments, are all disclosed herein to provide an animal food composition comprising an active, such as a Probiotic. In one embodiment, an article of commerce is disclosed comprising a package comprising an outer layer comprising a barrier having a permeability coefficient of no more than about $10^{-5}$ grams/day/cm$^2$/mmHg. It can include an animal food having a water activity of about 0.3 or less. The animal food can comprise a kibble comprising an active ingredient, such as a Probiotic, having an initial activity level. The package can be effective at maintaining the activity of the active at or above a certain level after a certain shelf life. In another embodiment, a method of providing an animal food having an active ingredient comprises providing the animal food and a package having a permeability of no more than about $10^{-5}$ grams/day/cm$^2$/mmHg and packing the animal food into the package. The animal food can have a water activity of less than about 0.3 when packed, and the package can be effective at maintaining the activity of the active at or above a certain level after a certain shelf life.

In one embodiment, a target dose level of the activity of the Probiotics can be chosen such that the Probiotic is at least at the target dose level upon ingestion by an animal. Based on this target dose level, in one embodiment, the following properties can be controlled and varied to reach the target dose level: package, desiccant, initial water activity of the animal food, and initial activity level of the Probiotic in the animal food. Therefore, in one embodiment a target dose level of the Probiotic of at least about $1\times10^4$ CFU/gram of animal food, $1\times10^6$ CFU/gram of animal food, $1\times10^8$ CFU/gram of animal food, $1\times10^{10}$ CFU/gram of animal food, $1\times10^{12}$ CFU/gram of animal food, or even more can be selected for a shelf life of at least about 6 months, or about 8 months, or about 10 months, or about 12 months, or about 14 months, or about 16 months, or about 18 months, or about 20 months, or about 22 months, or about 24 months, with a log loss of no more than about 0.5, or about 1.0, or about 1.5, or about 2.0, or about 2.5, or even more over the shelf life, resulting in an applied activity level of at least about $1\times10^5$ CFU/gram of animal food, or at least about $1\times10^7$ CFU/gram of animal food, or at least about $1\times10^9$ CFU/gram of animal food, or at least about $1\times10^{11}$ CFU/gram of animal food, or at least about $1\times10^{13}$ CFU/gram of animal food, an initial water activity when packing of no more than about 0.3, or no more than about 0.25, or no more than about 0.20, or no more than about 0.15, or no more than about 0.10, or no more than about 0.05, or no more than about 0.01, and a final water activity at the shelf life period of no more than about 0.5, or no more than about 0.45, or no more than about 0.40, or no more than about 0.35, or no more than about 0.30, or no more than about 0.25, or no more than about 0.20. The animal food can be packaged using any of the packages as disclosed herein, with or without a desiccant, to reach these desired properties of the animal food.

In one embodiment, an animal food having a water activity of less than about 0.30, or less than about 0.25, or less than about 0.20, or less than about 0.15, or less than about 0.10, or less than about 0.05, is disclosed. Water activity can be used, as disclosed herein, in animal food nutrition to formulate products that remain shelf stable, i.e. have a longer shelf life. Thus, in one embodiment, if an animal food is kept below a certain water activity, bacterial growth can be slowed or even prohibited. Shelf stability or shelf life as used herein means surviving conditions in a package wherein the active, such as a Probiotic, is not sufficiently activated such that the Probiotic microorganism is at or above a target dose level in the animal upon ingestion. In addition, in some embodiments, controlling water activity can help limit or slow certain undesirable reactions, such as non-enzymatic browning, fat oxidation, vitamin degradation, enzymatic reactions, protein denaturation, starch gelatinization, and starch retrogradation, all of which can decrease shelf life. Thus, water activity can be an important source of controlling the viability of an animal food, especially one containing a Probiotic.

In one embodiment, shelf life of an animal food composition can be up to about 24 months. In another embodiment, shelf life can be up to about 20 months. In another embodiment, shelf life can be up to about 16 months. In another embodiment, shelf life can be up to about 12 months. In other embodiments, shelf life can be the time at which the activity of an active drops below a critical level, such as a target dose level for animal ingestion. In one embodiment, the active can be a Probiotic in an animal food. In one embodiment, shelf life of the animal food can be when the activity of the Probiotic in the animal food drops below about $1\times10^{12}$ CFU/gram of the animal food. In one embodiment, shelf life of the animal food can be when the activity of the Probiotic in the animal food drops below about $1\times10^{10}$ CFU/gram of the animal food. In one embodiment, shelf life of the animal food can be when the activity of the Probiotic in the animal food drops below about $1\times10^{8}$ CFU/gram of the animal food. In one embodiment, shelf life of the animal food can be when the activity of the Probiotic in the animal food drops below about $1\times10^{6}$ CFU/gram of the animal food. In one embodiment, shelf life of the animal food can be when the activity of the Probiotic in the animal food drops below about $1\times10^{4}$ CFU/gram of the animal food. Thus, a target shelf life can be considered maintaining at least the target dose level of an active, such as a Probiotic, of an animal food for a certain number of months until and upon ingestion by the animal. In one embodiment, the target shelf life can be up to about 24 months at a target dose level of about $1\times10^{12}$ CFU/gram of the animal food. In other embodiments, the target shelf life can be up to about 24 months, 20 months, about 16 months, and about 12 months, for a target dose level of about $1\times10^{12}$ CFU/gram of the animal food, $1\times10^{10}$ CFU/gram of the animal food, $1\times10^{8}$ CFU/gram of the animal food, $1\times10^{6}$ CFU/gram of the animal food, and $1\times10^{4}$ CFU/gram of the animal food, and all combinations and mixtures thereof.

In one embodiment, the animal food can be applied with an active, such as Probiotics, by any of the methods disclosed herein or known to those of ordinary skill in the art, at an applied activity level. After experiencing the conditions as described herein, the activity level of the Probiotic, in one embodiment, will reduce over the course of a shelf life, as disclosed herein. In one embodiment, the activity level can reduce by about 0.5 logs, for example, from about $1\times10^{12}$ CFU/gram of animal food to about $5\times10^{11}$ CFU/gram of animal food. In another embodiment, the activity level can reduce by about 1.0 logs. In another embodiment, the activity level can reduce by about 1.5 logs. In another embodiment, the activity level can reduce by about 2.0 logs. These reductions in activity level, or log losses, occur over the duration of any of the shelf lives of the animal food composition as disclosed herein.

In another embodiment, a method is disclosed. The method, in one embodiment, can comprise providing an animal food comprising an active component; identifying a target dose level of the active component, wherein the active component is to be delivered to the animal through the animal food after a shelf life period at the target dose level; determining a water activity of the animal food and at least one tolerance condition; wherein the water activity and the tolerance condition are determined and related such that the active component is capable of being delivered to the animal at the target dose level.

Based on the description herein, a method of determining the water activity tolerance levels or tolerance conditions of an active, such as a Probiotic microorganism, is provided. The tolerance levels or tolerance conditions of a Probiotic microorganism can be based on the specific conditions of storage of the Probiotic microorganism, such as temperature, humidity, water activity, as described herein, among other non-limiting environmental and Probiotic microorganism conditions, and mixtures and combinations of these. In one embodiment, for a specific tolerance levels or tolerance conditions, the Probiotic microorganism can withstand the tolerance conditions for a specific amount of time down to a specific activity level. These specific amounts of time and specific activity levels can be those shelf lives and activity levels, such as the target dose levels, as disclosed herein.

Therefore, in one embodiment, the tolerance levels or tolerance conditions can be a combination of any of the conditions described herein, such as for example temperature and water activity, as disclosed herein, that result in a Probiotic microorganism activity level that is desired. Such an activity level can be the target dose level that is desired at the point of animal ingestion of the animal food. Thus, in one embodiment, the tolerance levels or tolerance conditions can be selected for the active, such as a Probiotic microorganism, and based on the tolerance levels or tolerance conditions, the article of commerce and the method of packing can be adjusted appropriately, as disclosed herein, to result in delivering an active, such as a Probiotic microorganism, at the desired target dose level based on the shelf life.

Packaging

In one embodiment, a package can be used to control water activity and thus Probiotic activity of an animal food. The animal food can be contained within the package. In one embodiment, the package can have moisture protection properties that control the moisture change inside the package, which can result in controlling the water activity of the animal food, which can contain Probiotics. In one embodiment, a package having a barrier layer can be used. The barrier layer can limit the water vapor transmission and the oxygen permeation. Such limiting of the water vapor transmission and oxygen permeation can assist in controlling the water activity of the animal food. Such control, as discussed herein, can allow for a desirable shelf life of animal food containing Probiotics.

Thus, in a sealed package, the animal food containing Probiotics and the air inside of the package are at some equilibrium water activity. This equilibrium water activity inside the package can change as water transports across the packaging material via diffusion. The transport of water across the packaging material can be driven by the difference in water activity inside the package versus the water activity outside the package. In one embodiment, the package can be made of paper, plastic, and combinations and mixtures thereof. Some embodiments of suitable packaging and articles of commerce are disclosed in United States Patent Publication No. 2009/0136163, published May 28, 2009, assigned to The Procter & Gamble Company. In one embodiment, the perforations as disclosed therein may not be used. In one embodiment, the package can be a bag that can be formed from a plastic laminate selected from the group consisting of ethylene-derived polymer, polypropylene, polyester, teraphthalates, polyolefins, homopolymer and or co-polymer polyolefins, woven polypropylene, and mixtures and combinations thereof. More particularly, the plastic laminate can be selected from the group consisting of ethylene-derived polymers such as polyethylenes in combination with teraphthalates such as polyethylene teraphthalate (PET). In one embodiment, the plastic laminate can be comprised of a nylon film laminated on polyethylene as disclosed herein. In one embodiment, the plastic laminate can be comprised of an outer layer can be polyethylene teraphthalate (PET), and an inner layer can be a co-extruded blend of linear low density polyethylene, medium density polyethylene, and linear low density polyethylene. As used herein the densities of polyethylene, "low", "medium", "high", and "ultra low/very low" have meanings as used and understood in the art for such materials.

In another embodiment, the package can include protective layers, non-limiting examples of which include waxes, paraffin, fats, and combinations and mixtures thereof. In another embodiment, moisture blocks and/or sinks can be used to modify the protective layer.

It should be understood that any type of packaging can be used for embodiments of the present invention. Non-limiting examples of packages include bags, pouches, any flexible form of boxes, any blow molded package, any injection molded package, bags in boxes, lined boxes, corrugated boxes, carton board boxes, thermoformed packages, cloth packages, glass packages, rubber packages, lined wooden boxes, woven materials, and polycarbonates packages.

In one embodiment, the package can be sized to contain from about one (1) pound of animal food up to any desired amount of pet food, such as about 100 pounds, and all ranges therebetween. In another embodiment, the package is sized to contain from about five (5) pounds to about 50 pounds. In another embodiment, the surface area of the package can be the resulting surface area when using an appropriately sized bag to contain the desire weight of animal food. In one embodiment, the surface area can be from about 500 cm$^2$ to about 20,000 cm$^2$, and all ranges therebetween. However, it should be understood that any size package can be used, and the size used can be dictated by those of skill in the packaging arts.

To assist in controlling the water activity of the animal food contained within the package, the package by way of the packaging materials, such as those disclosed herein, non-limiting examples of which include plastic laminate, can provide oxygen and moisture barrier properties. Thus, the permeability of the package can be varied. In one embodiment, the permeability of the package can be varied by using different types and combinations of package materials, layering more than one barrier material and/or type of barrier material, and by varying the thickness of the package, among others. In one embodiment, the permeability coefficient of the packaging material can be no more than about $10^{-5}$ grams/day/cm$^2$/mmHg. In another embodiment, the permeability coefficient of the packaging material can be no more than about $10^{-6}$ grams/day/cm$^2$/mmHg. In another embodiment, the permeability coefficient of the packaging material can be no more than about $10^{-7}$ grams/day/cm$^2$/mmHg. In another embodiment, the permeability coefficient of the packaging material can be no more than about grams/day/cm$^2$/mmHg. In one embodiment, the permeability coefficient of the packaging material can be between about $1 \times 10^{-6}$ to about $9 \times 10^{-6}$ grams/day/cm$^2$/mmHg. In another embodiment, the permeability coefficient of the packaging material can be between about $3 \times 10^{-6}$ to about $7 \times 10^{-6}$ grams/day/cm$^2$/mmHg. In another embodiment, the permeability coefficient of the packaging material can be between about $5 \times 10^{-6}$ to about $7 \times 10^{-6}$ grams/day/cm$^2$/mmHg. In another embodiment, the permeability coefficient of the packaging material can be between about $6 \times 10^{-6}$ to about $7 \times 10^{-6}$ grams/day/cm$^2$/mmHg.

In one embodiment, the permeability of the package, such as the permeabilities of the packages as disclosed herein, can be used to control the water activity of the animal food. In one embodiment, the water activity of the animal composition can be maintained below certain critical levels after a period of time inside the package. The period of time inside the package can be through a various set of environmental conditions, such as temperature and relative humidity conditions. The temperature and relative humidity conditions can vary as is customary during the lifecycle of an animal food, and these conditions can change constantly. In one embodiment, the animal food and package can be subject to conditions of a temperature of between about 20° C. and about 50° C. and a relative humidity of between of about 30% and about 80%, and mixtures and combinations of temperatures and relative humidities therebetween, including all ranges therebetween, for a period of time up to the shelf life of the animal composition. In one embodiment, the initial Aw (water activity) of the animal composition can be between about 0.05 and about 0.15, or can be about 0.10, when first stored in the packaged, and the final Aw of the animal composition can be between about 0.20 and 0.30 at the point of the shelf life of the animal composition. In another embodiment, the initial Aw (water activity) of the animal composition can be between about 0.10 and about 0.20, or can be about 0.15, when first stored in the packaged, and the final Aw of the animal composition can be between about 0.20 and 0.30 at the point of the shelf life of the animal composition. In one embodiment, the initial Aw (water activity) of the animal composition can be between about 0.15 and about 0.25, or can be about 0.20, when first stored in the packaged, and the final Aw of the animal composition can be between about 0.25 and 0.35 at the point of the shelf life of the animal composition. In one embodiment, the initial Aw (water activity) of the animal composition can be between about 0.20 and about 0.30, or can be about 0.25, when first stored in the packaged, and the final Aw of the animal composition can be between about 0.25 and 0.35 at the point of the shelf life of the animal composition. In one embodiment, the initial Aw (water activity) of the animal composition can be between about 0.25 and about 0.35, or can be about 0.30, when first stored in the packaged, and the final Aw of the animal composition can be between about 0.30 and 0.40 at the point of the shelf life of the animal composition.

In one embodiment, the permeability of the package, such as the permeabilities of the packages as disclosed herein, can be used to control the water activity of the animal food after a particular number of days or weeks. In one embodiment, the water activity can increase from between about 0.05 and about 0.15, or between about 0.10 and about 0.20, or between about 0.15 and about 0.25, or between about 0.20 and about 0.30, or between about 0.25 and about 0.35, to between about 0.15 and about 0.25, or between about 0.20 and about 0.30, or between about 0.25 and about 0.35, or between about 0.30 and about 0.40, or between about 0.35 and about 0.45 in up to about five weeks, and all combinations and mixtures thereof.

In one embodiment, the permeability of the package, such as the permeabilities of the packages as disclosed herein, can be used to control the activity of the active, such as Probiotic, in the animal food after a particular number of days or weeks. In one embodiment, the activity of the Probiotic can decrease from about $1\times10^{12}$ CFU/gram of animal food, or from about $1\times10^{11}$ CFU/gram of animal food, or from about $1\times10^{10}$ CFU/gram of animal food, or from about $1\times10^{9}$ CFU/gram of animal food, from about $1\times10^{8}$ CFU/gram of animal food, or from about $1\times10^{7}$ CFU/gram of animal food, or from about $1\times10^{6}$ CFU/gram of animal food, or from about $1\times10^{5}$ CFU/gram of animal food to about $1\times10^{9}$ CFU/gram of animal food, or to about $1\times10^{10}$ CFU/gram of animal food, or to about $1\times10^{9}$ CFU/gram of animal food, or to about $1\times10^{8}$ CFU/gram of animal food, or to about $1\times10^{7}$ CFU/gram of animal food, or to about $1\times10^{6}$ CFU/gram of animal food, or to about $1\times10^{5}$ CFU/gram of animal food, or to about $1\times10^{4}$ CFU/gram of animal food, and all combinations and mixtures thereof, respectively.

In one embodiment, the permeability of the package can be used to control the water activity of the animal food. In one embodiment, the water activity of the animal composition can be maintained below certain critical levels after a number of openings of the package. In a sealed package, the animal food containing Probiotics and the air inside of the package are at some equilibrium water activity. This equilibrium can be adjusted by ingress of water via diffusion through the packaging material while the package remains sealed. Additionally, this equilibrium can be adjusted by opening and reclosing the package, allowing air to enter the package. The equilibrium can vary with humidity, temperature, and percent air exchange that occurs. Before opening, the animal composition is at an initial Aw. The package can then be opened, some animal food is removed, air is circulated, and then the package is resealed. At this point, the weight of the animal composition in the package has decreased, and the volume of the air in the package has increased. The package can then reach a new equilibrium water activity. Additional openings and closings of the package can then occur, with similar effects.

Desiccant

In one embodiment, a desiccant can be used inside of the package with the animal food and can be used to control water activity and thus Probiotic activity of the animal food. A desiccant is a substance that maintains or reduces the water activity or moisture content of another substance or in a specific area or zone, such as inside a container. Solid desiccants can work by absorption or adsorption of water or a combination of the two. However, any kind and form of desiccants can be used, including other than solid. Non-limiting examples of commonly used desiccants can include calcium chloride, molecular sieve, silica, clay, zeolite, and combinations and mixtures thereof. In combinations and mixtures of desiccants, the amounts of the desiccants can be varied. Thus, whenever a desiccant is described herein, it should be understood that a mixture of desiccants can be used. In one embodiment, a desiccant mixture of silica and molecular sieve can be used. The desiccant mixture in one embodiment can comprise between about 60% and about 80% silica and between about 20% and 40% molecular sieve. In another embodiment, the mixture can comprise about 70% silica and about 30% molecular sieve. However, it should be understood that any amount of silica and molecular sieve can be used in the mixture. In another embodiment, a desiccant mixture of silica and calcium chloride can be used. The desiccant mixture in one embodiment can comprise between about 30% and about 60% silica and between about 40% and 70% calcium chloride. The desiccant mixture in one embodiment can comprise between about 40% and about 50% silica and between about 50% and 60% calcium chloride. However, it should be understood that any amount of silica and calcium chloride can be used in the mixture. Desiccants are commercially available from Desiccare, Inc. (Pomona, Calif. and Richland, Miss.).

In one embodiment, desiccants can be used as a pre-packaged material and added to a container of animal food. In such an embodiment, the desiccant is generally separate from the animal food and thus does not come into direct contact with the animal food since it can be enclosed within a protective package, such as a bag or sachet, for example. In another embodiment, desiccants can be directly applied, and thus be in direct contact, with the animal food. In another embodiment, a pre-packaged desiccant and a directly applied desiccant can be used. Varying amounts of desiccant can be used. In one embodiment, the ratio of the desiccant to animal food can be between about 1:100 and about 1:2. In another embodiment, the ratio of the desiccant to animal food can be between about 1:50 and about 1:10. In another embodiment, the ratio of the desiccant to animal food can be between about 1:50 and about 1:20. In another embodiment, the ratio of the desiccant to animal food can be between about 1:50 and about 1:30. All ratios therebetween can also be used in additional embodiments. In specific embodiments, between about 100 grams and 1000 grams of desiccant can be used per 20 pounds of animal food. In another embodiment, between about 200 grams and 600 grams of desiccant can be used per 20 pounds of animal food. In another embodiment, between about 250 grams and 500 grams of desiccant can be used per 20 pounds of animal food. In another embodiment, between about 200 grams and 300 grams of desiccant can be used per 20 pounds of animal food. In another embodiment, between about 400 grams and 600 grams of desiccant can be used per 20 pounds of animal food. In specific embodiments, about 250 grams of desiccant, or about 500 grams of desiccant, can be used per 20 pounds of animal food.

As described above, the desiccants, and combinations and mixtures thereof, can be effective in maintaining or even lowering the water activity of a substance, such as an animal food, in a container, such as any of the containers as described herein. Thus, in one embodiment, the initial water activity can decrease to a final water activity. In one embodiment, the desiccant can be effective at lowering the water activity by at least 90%. In one embodiment, the desiccant can be effective at lowering the water activity by at least 75%. In one embodiment, the desiccant can be effective at lowering the water activity by at least 50%. In one embodiment, the desiccant can be effective at lowering the water activity by at least 25%. In one embodiment, the desiccant can be effective at lowering the water activity by at least 10%. In one embodiment, the water activity can decrease from about 10% to about 90%, and all ranges therebetween. Thus, in one embodiment, the water activity of an animal food can be decrease from about 0.6 to about 0.06. Thus, in one embodiment, the water activity of an animal food can be decrease from about 0.6 to about 0.15. In another embodiment, the water activity of animal food can decrease from about 0.6 to about 0.3. In another embodiment, the water activity of animal food can decrease from about 0.6 to about 0.45. In another embodiment, the water activity of animal food can decrease from about 0.6 to about 0.54. Of course, the amount that the water activity decreases depends on the initial water activity. For example, if the initial water activity of the animal food is 0.4, and it decreases by 90%, the final water activity will be 0.04.

In one embodiment, the desiccant can perform inside the package upon multiple openings of the package. For example, opening of the package can introduce moisture into the package. The desiccant can operate by absorbing at least part of the moisture that enters the package upon opening and re-opening of the package, such that the water activity can be maintained or kept above certain levels as disclosed herein.

The desiccant lowering effect on the water activity can vary with time. In one embodiment, the water activity can be lowered by 90% after 18 weeks of the desiccant being added to the package. In another embodiment, the water activity can be lowered by 90% after 16 weeks of the desiccant being added to the package. In another embodiment, the water activity can be lowered by 90% after 14 weeks of the desiccant being added to the package. In another embodiment, the water activity can be lowered by 90% after 12 weeks of the desiccant being added to the package. In another embodiment, the water activity can be lowered by 90% after 10 weeks of the desiccant being added to the package. In another embodiment, the water activity can be lowered by 90% after 8 weeks of the desiccant being added to the package. In another embodiment, the water activity can be lowered by 90% after 6 weeks of the desiccant being added to the package. In another embodiment, the water activity can be lowered by 90% after 4 weeks of the desiccant being added to the package. In another embodiment, the water activity can be lowered by 90% after 2 weeks of the desiccant being added to the package. In other embodiments, the water activity can be lowered by 75%, 50%, 25%, or 10% after 18 weeks, 16 weeks, 14 weeks, 12 weeks, 10 weeks, 8 weeks, 6 weeks, 4 weeks, or 2 weeks after the desiccant being added to the package.

Kibble

Kibble-type animal feeds, such as dog and cat foods, can be dried, ready-to-eat pet food products. The kibbles can be formed by an extrusion process where the kibble raw materials are extruded under heat and pressure to form the pelletized kibble form or core. Extrusion technology can provide an inexpensive and efficient method for formulating animal feed kibbles, such as those having a starch matrix. During the extrusion process, the kibble raw materials, which can comprise the starch matrix, typically results in the starch matrix becoming gelatinized under the extrusion conditions, forming a gelatinized starch matrix. Thus, in one embodiment, the core can have a moisture content less than 12% and can comprise a gelatinized starch matrix, which can be formed by way of the extrusion process described herein. In one embodiment, the core can be nutritionally balanced.

A process of manufacture of the pet food product can generally include mixing components to form a core material mixture, extruding the core material mixture to form a core pellet, drying the core pellet, and optionally applying a dusting component to the dried core pellet to form a food pellet, and packaging the food pellets. In one embodiment, the food pellet can be the final desired food product. In one embodiment, the food pellet can undergo dusting steps to form the food product as desired.

The components used to form a core material mixture can be any individual starting components, including, but not limited to, farinaceous material, proteinaceous material, and mixtures and combinations thereof. In one embodiment, the core material can include, but is not limited to, protein materials, starch materials, fiber materials, fat materials, mineral materials, vitamin materials, and mixtures and combinations thereof. Protein materials can include, but are not limited to, chicken meal, chicken, chicken by-product meal, lamb, lamb meal, turkey, turkey meal, beef, beef by-product, viscera, fish meal, entrails and combinations thereof. Starch materials can include, but are not limited to, cereals, grains, corn, wheat, rice, oats, corn grits, sorghum, grain sorghum, wheat bran, oat bran, amaranth, durum wheat, and mixtures and combinations thereof. Fiber materials can include, but are not limited to, fructooligosaccharides, beet pulp, mannanoligosaccharides, oat fiber, citrus pulp, carboxymethylcellulose, gums such as gum Arabic, guar gum, and carragan, apple and tomato pomaces, citrus fiber, fiber extracts, fiber derivatives, dried beet fiber, distillers dried grain solids, and mixtures and combinations thereof. Fat materials can include, but are not limited to, poultry fat, chicken fat, turkey fat, pork fat, lard, tallow, beef fat, vegetable oils, corn oil, soy oil, cotton pellet oil, rape pellet oil, fish oil, menhaden oil, anchovy oil, palm oil, palm kernel oil, coconut oil, and mixtures and combinations thereof, and partially or fully hydrogenated versions of any of the aforementioned oils. Mineral materials can include, but are not limited to, sodium selenite, monosodium phosphate, calcium carbonate, potassium chloride, ferrous sulfate, zinc oxide, manganese sulfate, copper sulfate, manganese oxide, potassium iodide, cobalt carbonate, and mixtures and combinations thereof. Vitamin materials can include, but are not limited to, choline chloride, vitamin E supplement, ascorbic acid, vitamin A acetate, calcium pantothenate, pantothenic acid, biotin, thiamine mononitrate, vitamin B 12 supplement, niacin, riboflavin supplement, inositol, pyridoxine hydrochloride, vitamin D3 supplement, folic acid, vitamin C, mixtures and combinations thereof. In one embodiment, the core material can comprise additional components including, but not limited to, beef broth, brewers dried yeast, egg, egg product, flax meal, amino acids such as DL methionine, leucine, lysine, tryptophan, arginine, cysteine, aspartic acid, taurine, and mixtures and combinations thereof.

The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

The carbohydrate source, or starch ingredient or materials, can, in non-limiting examples, comprise cereals, grains, corn, wheat, rice, oats, corn grits, sorghum, grain sorghum/milo, wheat bran, oat bran, amaranth, Durum, and/or semolina. The protein source, ingredient, or materials, can, in non-limiting examples, comprise chicken meals, chicken, chicken by-product meals, lamb, lamb meals, turkey, turkey meals, beef, beef by-products, viscera, fish meal, enterals, kangaroo, white fish, venison, soybean meal, soy protein isolate, soy protein concentrate, corn gluten meal, corn protein concentrate, distillers dried grains, and/or distillers dried grains solubles. The fat source, ingredient, or materials, can, in non-limiting examples, comprise poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, and/or olestra.

According to one embodiment, a core can comprise a protein-based core matrix that can be greater than 70% by weight of a vegetable protein, wherein the protein-based core is substantially free of a matrix of gelatinized starch. In specific embodiments, the protein-based core matrix may comprise greater than 80% by weight of a vegetable protein. In still other embodiments the protein-based core matrix may comprise greater than 85%, 90% or even 95% by weight of a vegetable protein. Specific examples of vegetable proteins include any vegetable derived protein that is substantially free or can be modified or manufactured to be substantially free of gelatinized starch. Examples of vegetable proteins suitable for use in the various embodiments of the present disclosure include, but are not limited to, distiller's dried grains ("DDG"), distiller's dried grain solubles ("DDGS"), corn protein concentrate ("CPC"), corn gluten meal ("CGM"), soy protein isolate ("SPI"), soy protein concentrate ("SPC"), wheat gluten ("WG"), rice protein isolate ("RPI"), rice protein concentrate ("RPC"), sorghum protein concentrate ("SorgPC"), oat protein concentrate ("OPC"), barley protein concentrate ("BPC"), and combinations of any thereof.

In specific embodiments, the core can comprise from 25% to 99.99% by weight of the core matrix. In other embodiments, the core can comprise from 50% to 99% by weight of the core matrix. Specific embodiments of the cores can include a core matrix that may further comprise one or more other ingredients, such as ingredients that may improve processing, stability, and/or palatability, or provide specific nutritional requirements. For example, the core matrix may further comprise at least one of corn syrup solids, minerals, vitamins, prebiotics (e.g., fructo-oligosaccharides, oligofructosaccharides, inulin, chicory, xylo-oligosaccharides, mannan-oligosaccharides, lactosucrose, galacto-oligosaccharides, or resistant starch), vegetable oils, animal fats, fish oils, mineral oils, amino acids, fibers, animal proteins, fish proteins, emulsifiers, processing aids, humectants, and dextrins.

In many applications, starch can be added to the protein component of the core feed to improve stability, such as by holding the components in the kibble form. In certain applications, it may be desirable to provide a kibble that is substantially free of starch. However, formulation of a kibble, such as a protein based kibble without starch is not straight forward since the kibble stability without starch is reduced. The inventors of the various embodiments of the present disclosure have developed methodologies to produce an extruded protein-based core matrix kibble that is substantially free of a matrix of gelatinized starch and where the kibble is greater than 70% by weight of a vegetable protein. Thus, one embodiment of the present disclosure provides a protein-based core matrix, wherein the protein-based core is substantially free of a gelatinized starch matrix. Specific embodiments may comprise a protein-based core that has less than 5%, 2%, 1%, or even 0.5% by weight of gelatinized starch. Still other embodiments, the protein-based core matrix may be essentially free of gelatinized starch. As used herein, the term "essentially free" when used in reference to concentration of a specific component in a composition means less than a measurable amount using methods of concentration measurements common in the art.

Other ingredients can, in non-limiting examples, comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients, any of which can be considered a first component, a second component, a third component, etc. (out to any number of components). Suitable other actives can include biologics, for example, but not limited to, biologics selected from the group consisting of enzymes, antibodies, immunoglobulins, cytokines, epigenetic agents, vitamins, and Probiotic microorganisms, and mixtures and combinations of these. Sources of fiber ingredients can, in non-limiting examples, include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, chicory, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentioligosaccharide, pectic oligosaccharide, and/or hemicellulose. Sources of mineral ingredients can, in non-limiting examples, include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can, in non-limiting examples, include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can, in non-limiting examples, include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, peptides, and/or Serine. Sources of carotenoid ingredients can include lutein, astaxanthin, zeaxanthin, bixin, lycopene, and/or beta-carotene. Sources of antioxidant ingredients can, in non-limiting examples, include tocopherols (vitamin E), vitamin C, vitamin A, plant-derived materials, carotenoids (described above), selenium, and/or COQ10 (Co-enzyme Q10). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can, in non-limiting examples, include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and/or keratolytics.

Thus, a pet food in the form of a kibble can be formed as a core matrix. Upon forming the core matrix as a pellet, the core matrix, in one embodiment, can be dusted or coated in some fashion with an active, a non-limiting example of which is a Probiotic. Thus, one embodiment of the present invention provides a pet food in the form of a kibble comprising a core, which can be extruded as described above, and a coating and/or a dusting dusted onto the core. In one embodiment, the core can comprise from 50% to 100% of the entire coated/dusted kibble.

Various embodiments of the present disclosure can further provide for an animal feed kibble comprising at least one coating or dusting comprising at least one additive. As described herein, when a coating or dusting is said to be on a surface of the core matrix, the coating can be either directly in contact with the core matrix or in contact with one or more other intermediate coatings on the core matrix (i.e., as a specific layer in a series of coating layers on the surface of the core matrix). In specific embodiments, the coating can comprise a fat in addition to the at least one additive. In other embodiments, a powder can be dusted onto the core, as disclosed herein.

In certain embodiments, the at least one coating or dusting can comprise at least one active coating or dusting on the surface of the core matrix. As used herein, the term "active" means a coating or powder that comprises an active component, for example, but not limited to, components that can impart some desired benefit on the nutrition or health of the animal consuming the animal feed or can impart some desired aesthetic or palatability benefit to the animal feed. Examples of active components that can be incorporated or added into the active coatings or powder for dusting include, but are not limited to, any of the active ingredients disclosed herein, sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and still other ingredients, any of which can be considered a first component, a second component, a third component, etc. (out to any number of components). Sources of fiber ingredients can, in non-limiting examples, include fructooligosaccharides (FOS), beet pulp, mannanoligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), cellulose, α-cellulose, galactooligosaccharides, xylooligosaccharides, and oligo derivatives from starch, inulin, chicory, psyllium, pectins, citrus pectin, guar gum, xanthan gum, alginates, gum arabic, gum talha, beta-glucans, chitins, lignin, celluloses, non-starch polysaccharides, carrageenan, reduced starch, soy oligosaccharides, trehalose, raffinose, stachyose, lactulose, polydextrose, oligodextran, gentioligosaccharide, pectic oligosaccharide, and/or hemicellulose. Sources of mineral ingredients can, in non-limiting examples, include sodium selenite, monosodium phosphate, calcium carbonate, potassium chloride, ferrous sulfate, zinc oxide, manganese sulfate, copper sulfate, manganous oxide, potassium iodide, and/or cobalt carbonate. Sources of vitamin ingredients can, in non-limiting examples, include choline chloride, vitamin E supplement, ascorbic acid, vitamin A acetate, calcium pantothenate, pantothenic acid, biotin, thiamine mononitrate (source of vitamin B1), vitamin B12 supplement, niacin, riboflavin supplement (source of vitamin B2), inositol, pyridoxine hydrochloride (source of vitamin B6), vitamin D3 supplement, folic acid, vitamin C, and/or ascorbic acid. Sources of polyphenols ingredients can, in non-limiting examples, include tea extract, rosemary extract, rosemarinic acid, coffee extract, caffeic acid, turmeric extract, blueberry extract, grape extract, grapeseed extract, and/or soy extract. Sources of amino acid ingredients can include 1-Tryptophan, Taurine, Histidine, Carnosine, Alanine, Cysteine, Arginine, Methionine, Tryptophan, Lysine, Asparagine, Aspartic acid, Phenylalanine, Valine, Threonine, Isoleucine, Histidine, Leucine, Glycine, Glutamine, Taurine, Tyrosine, Homocysteine, Ornithine, Citruline, Glutamic acid, Proline, peptides, and/or Serine. Sources of carotenoid ingredients can include lutein, astaxanthin, zeaxanthin, bixin, lycopene, and/or beta-carotene. Sources of antioxidant ingredients can, in non-limiting examples, include tocopherols (vitamin E), vitamin C, vitamin A, plant-derived materials, carotenoids (described above), selenium, and/or COQ10 (Co-enzyme Q10). Sources of fatty acid ingredients can include arachidonic acid, alpha-linoleic acid, gamma linolenic acid, linoleic acid, eicosapentanoic acid (EPA), docosahexanoic acid (DHA), and/or fish oils as a source of EPA and/or DHA. Sources of glucose mimetic ingredients can include glucose anti-metabolites including 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, mannoheptulose, and/or avocado extract comprising mannoheptulose. Still other ingredients can, in non-limiting examples, include beef broth, brewers dried yeast, egg, egg product, flax meal, DL methionine, amino acids, leucine, lysine, arginine, cysteine, cystine, aspartic acid, polyphosphates such as sodium hexametaphosphate (SHMP), sodium pyrophosphate, sodium tripolyphosphate; zinc chloride, copper gluconate, stannous chloride, stannous fluoride, sodium fluoride, triclosan, glucosamine hydrochloride, chondroitin sulfate, green lipped mussel, blue lipped mussel, methyl sulfonyl methane (MSM), boron, boric acid, phytoestrogens, phytoandrogens, genistein, diadzein, L-carnitine, chromium picolinate, chromium tripicolinate, chromium nicotinate, acid/base modifiers, potassium citrate, potassium chloride, calcium carbonate, calcium chloride, sodium bisulfate; eucalyptus, lavender, peppermint, plasticizers, colorants, flavorants, sweeteners, buffering agents, slip aids, carriers, pH adjusting agents, natural ingredients, stabilizers, biological additives such as enzymes (including proteases and lipases), chemical additives, coolants, chelants, denaturants, drug astringents, emulsifiers, external analgesics, fragrance compounds, humectants, opacifying agents (such as zinc oxide and titanium dioxide), anti-foaming agents (such as silicone), preservatives (such as butylated hydroxytoluene (BHT) and butylated hydroxyanisole (BHA), propyl gallate, benzalkonium chloride, EDTA, benzyl alcohol, potassium sorbate, parabens and mixtures thereof), reducing agents, solvents, hydrotropes, solublizing agents, suspending agents (non-surfactant), solvents, viscosity increasing agents (aqueous and non-aqueous), sequestrants, and/or keratolytics.

In one embodiment, the active can comprise a Probiotic. According to specific embodiments, the active can comprise one or more bacterial Probiotic microorganism suitable for pet consumption and effective for improving the microbial balance in the pet gastrointestinal tract or for other benefits, such as disease or condition relief or prophylaxis, to the pet. Various Probiotic microorganisms known in the art are suitable for use in the present invention. See, for example, WO 03/075676, and U.S. Published Application No. US 2006/0228448A1. In specific embodiments, the Probiotic component can be selected from bacteria, yeast or microorganism of the genera *Bacillus, Bacteroides, Bifidobacterium, Enterococcus* (e.g., *Enterococcus faecium* DSM 10663 and *Enterococcus faecium* SF68), *Lactobacillus, Leuconostroc, Saccharomyces, Candida, Streptococcus*, and mixtures of any thereof. In other embodiments, the Probiotic can be selected from the genera *Bifidobacterium, Lactobacillus*, and combinations thereof. Those of the genera *Bacillus* can form spores. In other embodiments, the Probiotic does not form a spore. In another embodiment, the Probiotic can be freeze-dried or lyophilized. Non-limiting examples of lactic acid bacteria suitable for use herein include strains of *Streptococcus lactis, Streptococcus cremoris, Streptococcus diaceylactis, Streptococcus thermophilus, Lactobacillus bulgaricus, Lactobacillus acidophilus* (e.g., *Lactobacillus acidophilus* strain DSM 13241), *Lactobacillus helveticus, Lactobacillus bifidus, Lactobacillus casei, Lactobacillus lactis, Lactobacillus plantarum, Lactobacillus rhamnosus, Lactobacillus delbrukii, Lactobacillus thermophilus, Lactobacillus fermentii, Lactobacillus salvarius, Lactobacillus reuteri, Bifidobacterium longum, Bifidobacterium infantis, Bifidobacterium bifidum, Bifidobacterium animalis, Bifidobacterium pseudolongum*, and *Pediococcus cerevisiae*, or mixtures of any thereof. In specific embodiments, the Probiotic-enriched coating can comprise the bacterial strain *Bifidobacterium animalis* AHC7 NCIMB 41199. Other embodiments of the Probiotic-enriched coating can include one or more microorganisms identified in U.S. Published Application Nos. US 2005/0152884A1, US 2005/0158294A1, US 2005/0158293A1, US 2005/0175598A1, US 2006/0269534A1 and US 2006/0270020A1 and in PCT International Publication No. WO 2005/060707A2.

In certain embodiments, the active or Probiotic-enriched coating or dusting can have a viable Probiotic microorganism count of at least about $10^4$ colony forming units (CFU) per gram of the kibble, or at least about $10^5$ CFU per gram of kibble, or at least about $10^7$ CFU per gram of kibble. For example, the coating or dusting can have a viable Probiotic microorganism count of up to about $10^{11}$ CFU per gram of kibble, up to about $10^{11}$ CFU per gram of kibble, or up to about $10^9$ CFU per gram of kibble, or up to about $10^8$ CFU per gram of kibble. Enumeration as defined by CFU is determined using methods such as disclosed in U.S. Publication No. US 2006/0228448A1. Advantageously, the Probiotic enriched coatings or dustings provided herein having a shelf life of at least about three months, alternatively at least about six months, alternatively from about three months to about twenty-four months, alternatively from about six months to about eighteen months. In specific embodiments, the Probiotic enriched coatings or dustings can have a shelf life of at least 16 months. As used herein, the term "shelf life" refers to that property of the second component whereby about 1% or more, alternatively about 5% or more, alternatively about 10% or more, alternatively about 25% or more, alternatively about 50% or more, alternatively about 75% or more, of the Probiotic microorganisms of the Probiotic-enriched coating are viable at the referenced time period after exposure to ambient environmental conditions.

In specific embodiments, the active or Probiotic-enriched coating or dusting can comprise a yeast. Any of a variety of yeast can be utilized, and will be well-known in the art, such as those of the *Saccharomyces* genera (including, for example, *Saccharomyces cervisiae* (sometimes referred to as "Baker's yeast"), and *Candida utilis* (which can also be referred to as *Torulopsis utilis*). As used herein, yeast includes but is not limited to those incorporating one or more components incorporated from the environmental media upon which it is cultivated, such as mineral-enriched yeast. Various fermentation processes are well-known in the art.

In other embodiments, the active or Probiotic-enriched coating or dusting can comprise one or more enzymes. Enzymes particularly include those having beneficial biological activity in a pet, such as digestive or other therapeutic enzymes. Non-limiting examples include proteases, collagenases, lipases, amylases, cellulases, lysozymes, candidases, lactases, kinases, invertases, galactosidases, pectinases, ribonucleases (including deoxyribonucleases) and combinations thereof.

In other embodiments, the active or Probiotic-enriched coating or dusting can comprise one or more antibodies. Antibodies to viruses, pathogenic bacteria, parasites, or the like can be used in the coatings herein. Non-limiting examples include antibodies to feline rhinotracheitis, feline panleukopenia, feline calicivirus, feline pneumonitis, feline leukemia, canine distemper, canine parvovirus, coronavirus, *Borrelia burgdorferi* (Lyme Disease), *Toxoplasma gondii*, *E. coli*, campylobacter, *salmonella, clostridia*, bacteriodes, giardia, tapeworm, roundworm, coccidian, cryptosporidium, and combinations thereof.

In certain embodiments, the active or Probiotic-enriched coating or dusting can comprise one or more immunoglobulins. Non-limiting examples include immunoglobulin A (IgA), immunoglobulin M (IgM), immunoglobulin G (IgG), and combinations thereof. In other embodiments, the Probiotic-enriched coating can comprise one or more cytokines.

Non-limiting examples include transforming growth factor beta (TGF-beta), tumor necrosis factor alpha (TNF-alpha), interleukin-4, interleukin-10, interleukin-12, and combinations thereof.

The active or Probiotic-enriched coating or dusting can also comprise a prebiotic. "Prebiotic" includes substances or compounds that are fermented by the intestinal flora of the pet and hence promote the growth or development of lactic acid bacteria in the gastro-intestinal tract of the pet at the expense of pathogenic bacteria. The result of this fermentation can include a release of fatty acids, in particular short-chain fatty acids in the colon. This can have the effect of reducing the pH value in the colon. Non-limiting examples of suitable prebiotics include oligosaccharides, such as inulin and its hydrolysis products, oligofructose, fructo-oligosaccharides, galacto-oligosaccharides, xylo-oligosaccharides or oligo derivatives of starch. The prebiotics can be provided in any suitable form. For example, the prebiotic can be provided in the form of plant material which contains the fiber. Suitable plant materials include asparagus, artichokes, onions, wheat or chicory, or residues of these plant materials. Alternatively, the prebiotic fiber can be provided as an inulin extract, for example extracts from chicory are suitable. Suitable inulin extracts can be obtained from Orafti SA of Tirlemont 3300, Belgium under the trade mark RAFTILINE. Alternatively, the fiber can be in the form of a fructo-oligosaccharide such as obtained from Orafti SA of Tirlemont 3300, Belgium under the trade mark RAFTILOSE. Otherwise, the fructo-oligosaccharides can be obtained by hydrolyzing inulin, by enzymatic methods, or by using micro-organisms.

In specific embodiments, the animal feed kibble of the present disclosure can comprise from 0.01% to 75% by weight of the Probiotic-enriched coating. In other embodiments, the kibble can comprise from 0.3% to 50% or from 0.4% to 25% by weight of the Probiotic-enriched coating. The amount of Probiotic-enriched coating used in a particular embodiment of the animal feed kibble can depend on a variety of factors, such as, but not limited to, Probiotic type(s), animal diet, animal nutritional needs, and/or formulation of the animal feed. For example, in certain embodiments, the animal feed or animal diet can comprise primarily the kibbles according to present disclosure. In such a case, the kibble can comprise lower percent (by weight) concentrations of the Probiotic enriched coating. In other embodiments, the animal feed or diet can comprise one or more other ingredients. For example, in one embodiment, an animal feed can comprise two or more kibble-type ingredients, including an active kibble having a vegetable protein-based core matrix that is substantially free of gelatinized starch and at least one Probiotic enriched coating (as described in detail herein), and one or more traditional kibbles. In such a case, the active kibble can comprise a higher percent (by weight) concentration of the Probiotic-enriched coating. The concentration of the Probiotic coating included on the kibble can be readily determined from the amount of Probiotic (or other active ingredient) that is desired to be administered to the animal.

Coating materials for use in the active coatings, such as a Probiotic-enriched coating, are described hereinabove.

Specific embodiments of the present disclosure provide for an animal feed kibble comprising a core matrix; and at least one active coating on at least a portion of a surface of the core matrix. In certain embodiments, the at least one active coating comprises at least one Probiotic-enriched coating, such as a coating enriched in one or more Probiotic microorganisms described herein.

In certain embodiments, the animal feed kibbles of the various embodiments described herein include a kibble comprising from 25% to 99.99% by weight of core matrix and comprising from 0.01% to 75% by weight of at least one active coating. Other embodiments of the animal feed kibbles can comprise from 50% to 99.7% by weight of core matrix and 0.3% to 50% by weight of the at least one active coating. Still further embodiments of the animal feed kibbles can comprise from 75% to 99.6% by weight of core matrix and 0.4% to 25% by weight of the at least one active coating. The animal feed kibbles according to these embodiments can additionally comprise at least one additional coating on at least a portion of a surface of the active coating (or on one or more intermediate coatings on the active coating), as described herein.

Further embodiments of the present disclosure provide processes of forming an animal feed kibble, such as the various embodiments of the animal feed kibbles described in detail herein. According to specific embodiments, the process can comprise extruding a core matrix, as described herein and coating at least a portion of a surface of the core matrix with a coating, such as a coating comprising an active ingredient, including a Probiotic-enriched coating. In other embodiments, the process can further comprise coating at least a portion of a surface of the Probiotic coating with a second coating or layer.

In specific embodiments, the extruding of the core matrix can be done using a single screw extruder, while other embodiments can be done using a twin-screw extruder.

In another embodiment, the present disclosure provides a kibble-type pet food comprising a first kibble comprising a source of protein of from about 16% to about 50% by weight of the first kibble, a source of fat from about 5% to about 35% by weight of the first kibble and a source of carbohydrate; and a second kibble comprising a protein-based core matrix that is substantially free of a matrix of gelatinized starch, such as any of the protein-based core matrix kibbles described herein.

According to these embodiments, the first kibble can be a kibble that can provide protein, fat, and carbohydrate necessary for a diet to maintain good nutrition by the animal. In certain embodiments, the first kibble can comprise a source of protein ranging from 0% up to 50% by weight of the first kibble. In other embodiments, the source of protein can range from 16% to 50% by weight, or even 20% to 50% by weight of the first kibble. It will be recognized by one of skill in the art that many kibble formulations can be used in the first kibble to provide the desired amount of additional protein, fat, and carbohydrates. In addition, the first kibble can comprise additional ingredients, such as vitamins, minerals, colorants, flavorants, and the like.

In certain embodiments, the second kibble can comprise up to 90% of the kibbles in the pet food. For example, the second kibble can comprise from 2% to 90% of the kibbles, or from 2% to 50% of the kibbles, or even from 2% to 25% of the kibbles in the pet food. Alternatively, the kibbles can be present in specific ratios of the first kibble and the second kibble. For example in the pet food compositions of the present disclosure, the first kibble and the second kibble can be present at a ratio of at least about 2:1, or at least about 5:1, or at least about 10:1, all by weight. In another embodiment of the disclosure, the first kibble and the second kibble can be present at a ratio of from about 2:1 to about 50:1, or from about 5:1 to about 25:1, or from about 10:1 to about 20:1, all by weight.

In various embodiments, the second kibble can further comprise at least one active coating on at least a portion of a surface of the protein-based core matrix. For example, the at least one active coating can comprise any of the active coatings described herein. In one embodiment, the active coating can comprise a fat containing an additive, such as the fats and additives described herein. In a specific embodiment the at least one active coating can be a Probiotic-enriched coating. Examples of Probiotic-enriched coatings are described in detail herein.

The pet food composition can be comprised of physically distinct components (i.e., the first kibble and the second kibble). The pet food can be provided as a variety of different presentations of the first kibble and the second kibble. For example, the pet food composition can be provided as a heterogeneous mixture of the first kibble and the second kibble. Alternatively, the first kibble and the second kibble can be provided as discretely packaged components, which can be combined in any manner or amount desired at the time of feeding. To illustrate, the pet food composition can comprise a first containing device and a second containing device, wherein the first containing device contains at least a portion of the first component and the second containing device contains at least a portion of the second component; for example, the first containing device can be a bag whereas the second containing device can be a canister. For convenience of the consumer, the bag containing at least a portion of the first component can also contain the canister containing at least a portion of the second component. Any of a variety of other presentations will be well-understood by those of ordinary skill in the art.

The pet food compositions or components thereof, can or can not be nutritionally balanced.

The first kibble of the pet food compositions of the present disclosure can comprise a source of protein, a source of fat and a source of carbohydrate. Examples of a first kibble include traditional pet food kibbles. The first kibble itself can be, or can not be, nutritionally balanced. In one embodiment, the first component is nutritionally balanced.

In one embodiment, the first kibble can comprise, on a dry matter basis, from about 20% to about 50% crude protein, or from about 22% to about 40% crude protein, by weight of the first kibble. The crude protein material can comprise any material having a protein content of at least about 15% by weight, non-limiting examples of which include vegetable proteins such as soybean, cottonseed, and peanut, animal proteins such as casein, albumin, and meat tissue. Non-limiting examples of meat tissue useful herein include fresh meat, and dried or rendered meals such as fish meal, poultry meal, meat meal, bone meal, and the like. Other types of suitable crude protein sources include wheat gluten or corn gluten, and proteins extracted from microbial sources such as yeast.

The first kibble can comprise a source of fat. In one embodiment, the first kibble can comprise, on a dry matter basis, from about 5% to about 35% fat, preferably from about 10% to about 30% fat, by weight of the first component. Sources of fat are widely known, including any component comprising a source of fat, defined herein to be inclusive of, for example, wax, fat, fatty acid, and lipid. Specific examples of wax, fat, fatty acid, or lipid can often be interchangeable in accordance with nomenclature common in the art; for example, a lipid can often also be characterized as a fat. The inventors herein do not intend to be limited by any particular designation of nomenclature, and classifications of a particular material as a wax, fat, fatty acid, lipid, or the like is made for purposes of convenience only.

For example, the lipid component can comprise a fat which is a cocoa butter component or a plant oil or partially hydrogenated plant oil. Alternatively or additionally, the lipid component can comprise an animal-derived fat component. As will be commonly known in the art, the animal-derived fat component comprises a fat derived from an animal. Non-limiting examples include beef, poultry, pork, and lamb (e.g., lards and tallows). Dairy fats can also be examples, including milkfat, fractionated milkfat, and butterfat. Alternatively or additionally, the lipid component can comprise a fatty acid. Illustrative sources include omega-3 or omega-6 fatty acids. Other examples of suitable fatty acids can include oleic acid, stearic acid, palmitic acid, and lauric acids, including suitable salts thereof. Even further examples of suitable fatty acids include esters or other derivatives thereof, such as cetyl palmitate, acetic, lactic, or citric mono- and di-glyceride fatty acids, isopropyl palmitate, isopropylmyristate, and mono-, di-, and triglycerides (some of which can also be characterized as fats). Alternatively or additionally, the compositions can comprise wax. For example, illustrative waxes include paraffin wax, beeswax (e.g., white or yellow), carnuba wax, candellila wax, microcrystalline wax, rice bran wax, cetyl ester wax, and emulsifying wax.

Grains or cereals such as rice, corn, milo, sorghum, barley, alfalfa, wheat, and the like are illustrative sources of carbohydrate. These carbohydrate sources, and typical levels thereof, are widely known in traditional pet food compositions.

Dusting

One embodiment of the present invention provides a pet food in the form of a dusted kibble comprising a core, which can be extruded as described above, a dusting dusted onto the core. In one embodiment, the core can comprise from 50% to 100% of the entire dusted kibble. In one embodiment, the core can have a moisture content less than 12% and can comprise a gelatinized starch matrix, which can be formed by way of the extrusion process described herein. In one embodiment, the core can be nutritionally balanced.

In one embodiment, the dusted kibble comprises a core and a dusting. The core can comprise several ingredients that form a core matrix. In one non-limiting example, the core can comprise a carbohydrate source, a protein source, and/or a fat source. In one embodiment, the core can comprise from 20% to 100% of a carbohydrate source. In one embodiment, the core can comprise from 0% to 80% of a protein source. In one embodiment, the core can comprise from 0% to 15% of a fat source. The core can also comprise other ingredients as well. In one embodiment, the core can comprise from 0% to 80% of other ingredients.

Embodiments of the present disclosure can comprise animal feed kibbles comprising a kibble comprising a core matrix, as described herein, and a dusting. The dusting can comprise at least one active ingredient dusting on the surface of the core matrix and can be referenced as an active dusting, or a dusting comprising actives, or active components. Suitable actives are disclosed herein and include, for example, but not limited to, enzymes, antibodies, immunoglobulins, cytokines, epigenetic agents, vitamins, and Probiotic microorganisms and materials. Additionally, the dusting can comprise any of the active ingredients listed herein.

In specific embodiments, the active dusting can comprise at least one Probiotic enriched dusting. The Probiotic enriched dusting can, in non-limiting examples, comprise a Probiotic selected from the group consisting of a Probiotic component having a Probiotic microorganism activity of at least $10^5$ CFU/gram, yeast, enzymes, antibodies, immunoglobulins, cytokines, epigenetic agents, and mixtures and combinations thereof. In other embodiments, the Probiotic can be measured in reference to the weight of the kibble. As used herein, the terms Probiotic, Probiotic ingredient, Probiotic microorganism, and Probiotic agent are all used synonymously and interchangeably.

As mentioned above, the dusting can comprise a first component, such as an active as described above, which can be, but is not limited to, a Probiotic microorganism. In one embodiment, the first component can comprise the entire dusting such that the dusting is substantially free of other substances. In one embodiment, the dusting can comprise a second component, such as a second active as described above, which can be, but is not limited to, a vitamin. In still another embodiment, the dusting can comprise a third component, such as third active as described above, which can be, but is not limited to, a glucose mimetic. Other embodiments can include any number of components, such as additional actives as described above. Thus, the dusting can comprise any number of components, such as actives.

In one embodiment, the dusting and/or core can be free of or substantially free of a binding agent, binder, and/or carrier/carrier substrate for the dusting to be dusted on the core or other dustings in the case of multiple dustings. In one embodiment, a binder, binding agent, or carrier means a substance or composition that is used primarily for, or assisting in, securing, cohering, affixing, binding, adhering, or sticking a substance or composition to another substance or composition. For example, a fat ingredient, protein, water, flavor coatings can be used as a binder, binding agent, or carrier/carrier substrate for a Probiotic to adhere, or stick to, an animal feed, such as a pet food kibble. Thus, in one embodiment, a dusted kibble can comprise a core and a dusting, wherein substantially no binding agent, binder, or carrier is used. The dusting, as described herein, can in one non-limiting example comprise a Probiotic.

Dusting

In one embodiment, an active can be applied to a core using a dusting process, resulting in a dusted kibble. The active can comprise a Probiotic. While the dusting embodiment will be described in terms of dusting a Probiotic component onto a core, it should be understood that any ingredient conducive to dusting can be used and so the present Applicants are not meant to be limited to only Probiotics. Without being bound by theory, it is thought that Van der Waals forces provide for the appropriate adhesion between the Probiotic particles and the core such that the dusting comprising Probiotic particles can be substantially free of a binder or binding agent. Without being bound by theory, it is thought that the Van der Waals forces provide the attractive force between the dusting and the core. Additionally, and without being bound by theory, it is also thought that hydrogen bonds play a role in the adhesion. A hydrogen bond is the attractive force between a hydrogen atom covalently bonded to an electronegative atom, such as nitrogen, oxygen, and fluorine, and another electronegative atom of a separate molecule. The electronegative atoms have a greater electron pull making the vicinity around these atoms negatively charged. This uneven distribution of electrons makes the hydrogen region carry a positive charge allowing the dipole intermolecular interaction between the two molecules. The bond is stronger than Van der Waals bonds but weaker than covalent, intramolecular bonds. Most proteins and carbohydrates contain several groups which are able to form hydrogen bonds.

Thus, in one embodiment, the dusting can comprise Probiotics and be substantially free of a binder or binding agent. Thus, the dusting process can comprise dusting the dusting onto the core, wherein the dusting comprises Probiotics and is substantially free of a binder or binding agent.

In one embodiment of the present invention, a process for dusting a pet food kibble comprises providing a pet food kibble in the form of a core matrix having a surface, providing a powder comprising a first component, dusting the powder onto the surface of the pet food kibble or core matrix, or kibble, wherein the dusting occurs substantially free of a binding agent or carrier. As used herein, the term "dusting" or "dusted" or "to dust" means to apply with a powder, fine particle, or dust-like material, such as applying a powder comprising Probiotic microorganisms, and/or its constituents, and/or any stability/preservative aids, that are in the form of solid particles. In one embodiment, dusting can be a dry mixing of a powder, such as an active such as a Probiotic, onto an animal food, such as a kibble as disclosed herein. The dry mixing process can also be performed substantially free of a binder, binding agent, and/or carrier substrate, as disclosed herein. Dusting can be performed in one embodiment such that its purpose can ensure substantially homogenous application throughout a group of kibbles being dusted. In one embodiment, most or substantially all of the surface area of a kibble can be exposed to the Probiotic powder. In one embodiment, distribution of the powder can be substantially even over the surface of a kibble. As used herein, dusting can be with the intent to disperse the powder, or dust, over at least the majority of the surface. In one embodiment of dusting, a mechanical mixer can be used, as disclosed herein. Sprinkling, on the other hand, can be scattered or random arrangement of the powder on the kibbles and does not expose substantially all of the surface area of the kibble to the powder. Sprinkling also is a form of topical application over only a portion or a limited surface of a substance. Additionally, sprinkling is usually a manual operation, such as a human sprinkling powder over a mass of animal food. In one embodiment, when comparing sprinkling to dusting, dusting results in a much higher level of adhesion of the powder then does sprinkling. Dusting of the Probiotic microorganisms can occur using a mixture, such as a mixture in a powder form that can be applied with mixing equipment as described herein to ensure near homogenous application throughout a batch of kibbles. Thus, the mixture or powder can comprise a count of Probiotic microorganisms, which can be only Probiotic microorganisms or can be mixed with another ingredient or ingredients, such as a stability aid and/or preservative aid, as described herein. In certain non-limiting examples, including embodiments as disclosed herein, the Probiotic powder can comprise between about 1 gram per 10,000,000 grams of kibble to about 1 gram per 10 grams of kibble, and all whole numbers ranges therebetween. These weights of powder can include the stability aids and preservative aids as described herein, such as maltodextrin and ascorbic acid, for example. In some embodiments, the dusting can be substantially even over the surface of the core. In other embodiments, the dusting is not substantially even over the surface of the core.

Additionally, in one embodiment of the present invention, the dusting can occur substantially free of a binder, binding agent, or carrier. In one embodiment, the binder, binding agent, or carrier does not include the particles or constituents included in the Probiotic powder, such as the stability and/or preservative aids as described herein. In other embodiments, the Probiotic powder can be substantially free of the stability and/or preservative aids. In one embodiment, substantially free of means less than 5 parts per million of the dusting. Non-limiting examples of binders, binding agents, and carriers can include liquefied agents that are applied to the surface of a kibble for the use of adhering dried particulates or substances. Non-limiting examples can include fats and fat matrices such as, but not limited to, soybean oil, cottonseed oil, poultry fat, tallow, partially hardened fats, winterized fats, partial glycerides such as mon-, di-, and trigylcerides and mixtures and combinations thereof; waxes; proteins or proteinaceous materials such as, but not limited to, chicken broth, whey, egg white, hydrolyzed proteins, corn zein, and gelatin; sugars and sugar matrices; starches and/or modified starches, and/or. These binders can typically be applied to a surface using a liquid or solvent that the binder is dissolved or suspended in.

It should be understood that the Probiotic powder that can be dusted can include stability and/or preservative aids. Stability aids can be considered to scavenge free water. Preservative aids can be considered to scavenge free radicals. For example, in the case of Probiotics, the powder can contain stability aids, such as, but not limited to, maltodextrin and/or sugars, and/or preservative aids, such as, but not limited to, ascorbic acid. Thus, in one embodiment, the powder comprises Probiotic microorganisms, a stability aid, and a preservative aid. In one embodiment, the powder can comprise 100% Probiotic microorganism. In another embodiment, the powder can comprise between about 50% and about 99% Probiotics, between about 60% and about 90% Probiotics, between about 65% and about 85% Probiotics, between about 65% and about 75% Probiotics, between about 1% and 50% stability aid, between about 10% and 40% stability aid, between about 15% and 35% stability aid, between about 25% and 35% stability aid, non-limiting example such as maltodextrin, and between about 0% and about 5% preservative aid, between about 0% and about 3% preservative aid, between about 0% and about 2% preservative aid, between about 0.5% and about 1.5% preservative aid, non-limiting example such as ascorbic acid, and all combinations and mixtures thereof, including all ranges therebetween. These stability aids and preservative aids, in one embodiment, are not considered binders, binding agents, or carriers, and no additional carrier or binder is being added to the powder for the purpose of binding, such as binding to the pet food kibble. These stability and/or preservative aids can be added for the stability of the Probiotic microorganism. Thus, in one embodiment, the dusting powder contains greater than 20% Probiotic with a CFU that can be greater than $10^9$ CFU per gram, $10^{11}$ CFU per gram, and greater than $10^{13}$ CFU per gram. In another embodiment, the powder can comprise Probiotic microorganisms, maltodextrin, and ascorbic acid.

The particle size of each Probiotic microorganism, or mixture in powder form, can be any size that results in adherence of at least one Probiotic microorganism, for however long, to the base material, such as the core matrix of a kibble. In one embodiment, a mixture of Probiotic microorganisms can comprise Probiotic microorganisms having a particle size of less than 100 micrometers. In one embodiment, a mixture of Probiotic microorganisms can comprise Probiotic microorganisms having a particle size of less than 75 micrometers. In one embodiment, a mixture of Probiotic microorganisms can comprise Probiotic microorganisms having a particle size of less than 75 micrometers but greater than 10 micrometers. In another embodiment, a mixture of Probiotic microorganisms can comprise Probiotic microorganisms having varying particle sizes, such as a portion less than 100 micrometers and a portion greater than 100. In at least one embodiment, the portion of Probiotic microorganisms having a particle size greater than 500 micrometers may not be conducive to dusting in that adherence to a kibble does not readily or easily occur. In any of these embodiments, the mixture of Probiotic microorganisms can include Probiotic microorganisms having particle sizes outside of the specific range or can include only Probiotic microorganisms having particle sizes only within the specific range. Particle sizes conducive to dusting can include particle sizes such as less than 500 micrometers, less than 400 micrometers, less than 300 micrometers, less than 200 micrometers, less than 100 micrometers, and as low as 10 micrometers, and all ranges therebetween. In one embodiment, the particle size can be from 10 micrometers to 75 micrometers.

With further reference to size, and appreciating that in some embodiments particle sizes can take multiple shapes, irregular shapes, and dimensions, whenever the size of the particles is discussed, it should be understood that the sizes can be determined or measured by way of mesh screens using ASTM E 11-70 (1995). Thus, the less than 75 microns size as described herein can be determined by those particles that pass through a No. 200 mesh. Accordingly, the appropriate mesh size can be used to determine or measure the particle size as needed as described herein.

To assist in understanding particle sizes of the Probiotic microorganisms described herein, the following description is provided. The Probiotic powder can be made, in one embodiment, by fermenting the Probiotic bacteria in a nutrient-rich broth in very large stirred tanks. When the fermentation is complete, the broth is dried off, until only a solid remains. This solid is then ground up to a powder, which can be freeze dried, or lyophilized, and which can be used in embodiments of the present invention disclosed herein for dusting. This powder can be the dried fermentation broth and can have nutrients, bacteria byproducts, and/or dormant Probiotic bacteria/microorganisms. The powder can contain stability aids, such as, but not limited to, maltodextrin and/or sugars, and/or preservative aids, such as, but not limited to, ascorbic acid. Thus, in one embodiment, only a portion of the powder comprises Probiotic microorganisms. Additionally, the powder particles generally can be comprised of irregular shape particles and measured or determined as described herein. It should be understood that the above is only one process of making a Probiotic, and any Probiotic that is conducive to dusting can be used, no matter the process of making it.

In one embodiment, the mixture to be dusted can comprise any of the other and/or active ingredients as described herein. Other ingredients can, in non-limiting examples, comprise active ingredients, such as sources of fiber ingredients, mineral ingredients, vitamin ingredients, polyphenols ingredients, amino acid ingredients, carotenoid ingredients, antioxidant ingredients, fatty acid ingredients, glucose mimetic ingredients, Probiotic ingredients, prebiotic ingredients, and mixtures or combinations thereof. The mixture to be dusted can comprise particles of the appropriate size that are best suitable for dusting such that they adhere to the kibble.

Thus, various other embodiments of the animal feed kibbles described herein can further comprise at least one additional active that can be dusted. The additional active can also be coated, in one embodiment, using a binder. For example, the at least one additional dusting or coatings can include one or more dustings or coatings containing additional active ingredients (including those described herein) or one or more Probiotic-enriched coatings or dustings. In other embodiments, the one or more additional coatings or dustings can comprise only the coating material, wherein the one or more additional dustings or coatings can increase the stability of the food composition.

It should be understood that although within this disclosure sizes of Probiotics particles are disclosed, those sizes in no way are meant to be limiting in that any size of particles can be used for dusting. Moreover, any mixtures of sizes of particles can be used. Thus, the mixture can include particles of multiple sizes. Mixtures can include particles of substantially the same size or of differing sizes, all or some of which are conducive to dusting. Other mixtures can include particles of the mixture that can be conducive to dusting while other particles of the mixture may not be conducive to dusting. Of course, different types of particles can be used, as described herein.

Thus, embodiments of the present invention can comprise adhering a solid Probiotic microorganism, or any other active, onto a kibble, such as by dusting the Probiotic microorganism onto the surface of the kibble core substantially without the use of a binding agent or carrier to form a dusted kibble. In one embodiment, the dusted kibble comprises a kibble comprising a core matrix, as described hereinabove, a powder comprising Probiotic microorganism particles, wherein the powder comprises a dusting on the core matrix to form a dusted pet food kibble that is substantially free of a binder, binding agent, and/or carrier. In one embodiment, the dusting adheres to the surface of the kibble. However, it should be understood that the surface of a kibble is generally not a uniform, smooth surface. In most circumstances, the surface of a kibble can be generally rough and thus have many nooks, depressions, recesses, indentions, impressions, and the like. Thus, in at least one embodiment, when the powder described herein is dusted onto the kibble, the particles of the powder can adhere to not only the surface of the kibble but also into these nooks, depression, recesses, indentions, impressions, and the like.

As described above, in one embodiment, the kibble can be substantially free of a binder, binding agent, or carrier. Thus, in this embodiment, the dusting can be performed substantially without the use of a binder, binding agent, or carrier for use in binding or in adhering the Probiotic microorganisms to the kibble. Binders or carriers can typically be used for assisting in adhering or protecting the active ingredient, such as Probiotic microorganisms, to the kibble. For example, a fat coating can be applied to the core, which can assist in applying the Probiotic microorganisms in that the core has been made more receptive to receiving and adhering the Probiotic microorganisms since it is more adhesive from the properties of the fat. Alternatives include encapsulation of the Probiotic microorganisms, other coatings, carriers in the Probiotic mixture that adhere to the coating of the core, among others.

Thus, in embodiments wherein the dusting can be substantially free of a binder or carrier agent, many variables exist that can affect the adhesion properties of the powder during the dusting process. Moreover, without being limited to theory, it is thought that many of the variables can be adjusted, either during the dusting process or to the core itself, to result in a commercially feasible pet food kibble having a dusting of powder. Among the variables that can affect adhesion properties of the powder can be the particle size of particles in the powder, the surface area of the core that is available for powder adhesion, temperature of the core when dusting, surface roughness of the core, amount of powder that is used, the method of application of the powder to the core, electrostatic charges, and the relative humidity of the local environment at the time of powder application to the core. Each of these variables is now taken in turn.

As described above, in one embodiment, the particle size of the particles in the powder can affect the adhesion properties of the powder onto the core. In one embodiment, the powder can comprise Probiotic microorganisms having a particle size less than 100 micrometers. In another embodiment, the powder can comprise Probiotic microorganism having a particle size less than 75 micrometers. In one embodiment, the Probiotic microorganism can have a particle size of between about 10 micrometers and about 75 micrometers. In any of these embodiments, the Probiotic powder, which can contain stability aids and/or preservative aids, can also have particles sizes that match the particles sizes for Probiotics, as described herein. As described before, particle size is defined as particle size as measured by laser diffraction analysis under ISO 13320. The present inventors have found that, in at least one embodiment, when using a powder comprising Probiotic microorganisms as described herein, as particle size of the powder decreases, or gets smaller, gravitational forces that predominate on larger particles become less pronounced, and Van der Waals forces predominate. In general, Van der Waals forces predominate for particles sizes less than 100 micrometers, which results in particle sizes less than 100 micrometers being particularly, but not exclusively, advantageous. It should further be understood that the particle sizes as disclosed herein can be for a portion of the particles of a powder. Thus, in one embodiment, a powder can be dusted, wherein a portion of the particles have particles sizes as disclosed herein.

In one embodiment, the surface area of the core that is available for powder adhesion can also affect the adhesion properties of the powder onto the core. In one embodiment, the surface area of the core available is minimally enough so that each particle being applied can contact the surface of the core. In another embodiment, and as those of ordinary skill in the art are aware, extruded dry pet food cores can have irregular textured surfaces, resulting in large surface area and pits, pores, crevices, and the like, as described above, into which many particles can become lodged and thus deposited onto the kibble core. In one embodiment, kibble surface areas of between about 1 $m^2/9$ L of volume and 10 $m^2/9$ L of volume can be used and all whole number ranges therebetween. In another embodiment, a surface area of between about 4 $m^2/9$ L and about 6 $m^2/9$ L can be used.

In one embodiment, and as described in additional detail throughout this disclosure, multiple temperature variables can also affect the adhesion properties of the powder onto the core. For example, the temperature of the core, the temperature of the powder, and the temperature of the dusting process can all, individually and collectively, affect the adhesion properties of the powder onto the core. In one embodiment, the core temperature can be above 0° C., or the freezing point of water. At temperatures below the freezing point of water, ice crystals may form on the surface of the core, resulting in an in increased surface hardness. This increased surface hardness can impede adhesion of the powder. In another embodiment, the core temperature is kept at between 0° C. and 20° C. during any part of the dusting process. In another embodiment, the core temperature is kept at between 0° C. and 80° C., or between at between 0° C. and 60° C., or at between 20° C. and 80° C. during any part of the dusting process. In another embodiment, the core temperature is kept at between 20° C. and 80° C. during any part of the dusting process. Additionally, in another embodiment, the core temperature can be lower than the deactivation point of the Probiotic microorganism or other active material.

In one embodiment, the humidity during dusting can be varied. In one embodiment, the humidity can be less than 20%. In another embodiment, the humidity can be less than 30%. In another embodiment, the humidity can be less than 40%. In another embodiment, the humidity can be less than 50%. In another embodiment, the humidity can be less than 60%. In another embodiment, the humidity can be less than 70%. In another embodiment, the humidity can be less than 80%. In another embodiment, the humidity can vary depending on the temperature of the core during dusting. In one embodiment wherein the temperature of the core is about 40 C, the humidity can be no more than 30%. In another embodiment wherein the temperature of the core is above 40 C, the humidity is no more than 30%.

In another embodiment, the water activity of the kibble can affect dusting. In one embodiment, dusting can occur on a kibble having a water activity of about 0.1 or less. In one embodiment, dusting can occur on a kibble having a water activity of about 0.2 or less. In one embodiment, dusting can occur on a kibble having a water activity of about 0.3 or less. In one embodiment, dusting can occur on a kibble having a water activity of about 0.4 or less. In one embodiment, dusting can occur on a kibble having a water activity of about 0.5 or less. In one embodiment, dusting can occur on a kibble having a water activity of about 0.6 or less. In another embodiment, the core can be at a water content of less than 12% during dusting.

In another embodiment, the dusting of Probiotic powder can occur wherein the loss of activity of the Probiotic can be reduced. In one embodiment, the dusting can result in a log loss of activity of about 0. In another embodiment, the dusting can result in a log loss of activity of less than 0.5. In another embodiment, the dusting can result in a log loss of activity of less than 1.0. In another embodiment, the dusting can result in a log loss of activity of less than 1.5. In another embodiment, the dusting can result in a log loss of activity of less than 2.0. The dusting and associated log loss of activity can occur with any sized Probiotic as disclosed herein.

Thus, embodiments of the present invention can include any combination or mixtures of the above variables.

It should be understood that throughout this disclosure coating embodiments and dusting embodiments are used and wherever within this disclosure the term coating is used, it should be understood that dusting can also be used. Thus, any pet food embodiments can be dusted and/or coated.

Process

Processes common to making dry pet foods can include milling, batching, conditioning, extrusion, drying, and dusting. Milling can encompass any process used to reduce whole or partial ingredients into smaller forms. Whole or partial formulations can be created in the process step for batching by mixing dry and/or liquid ingredients. Often these ingredients are not in the most nutritious or digestible form, and thus processes are needed to further convert these ingredients to a digestible form via a cooking process.

During the milling process, the individual starting components of the core material can be mixed and blended together in the desired proportions to form the core material. In one embodiment, the resulting core material can be screened to remove any large agglomerate of material therefrom. Any sort of conventional solids mixer can be used for this step including, but not limited to, plough mixers, paddle mixers, fluidizing mixers, conical mixers, drum mixers, and mixtures and combinations thereof. One skilled in the art of solids mixing would be able to optimize the mixing conditions based on the types of materials, particle sizes, and scale, from any one of a number of widely available textbooks and articles on the subject of solids mixing.

The core material mixture can then be fed into a conditioner. Conditioning can be used to pre-treat the ingredients and can include hydration, addition/mixing of other ingredients, partial cooking, and mixtures and combinations thereof. Cooking can often be accomplished by the addition of heat in the form of steam and can result in discharge temperatures of about 113 to about 212° F. Pressurized conditioning can be used when temperatures need to be elevated above standard atmospheric conditions, such as those greater than about 212° F. Conditioned ingredients can then be transferred to an extruder for further processing.

The core material can then be subjected to an extrusion operation in order to obtain an expanded core pellet. In one embodiment, the core material can be routed to a hopper prior to the extrusion operation. The extruder can be any suitable single or twin screw, cooking extruder. Suitable extruders can be obtained from Wenger Manufacturing Inc., Clextral SA, Buhler AG, and the like. Conditions of the extruder can vary depending on the particular product to be made. For example, the texture, hardness, or bulk density of the extruded product can be varied using changes in the extruder operating parameters. Similar to conditioning, extrusion can be used to incorporate other ingredients (such as carbohydrates, proteins, fats, vitamins, minerals, and preservatives) by having dry and/or liquid ingredient streams added anywhere along the length of the extruder feed port, barrel, or die. Extruders can be, but not limited to, single- or twin-screw in design and designed to operate up to 1700 rpm, or even more. The extrusion process can be often accompanied with high pressure (up to 1500 psig) and high temperature (up to 250° C.). Extrusion can be used to accomplish the making of continuous ropes or sheets but also discrete shapes and sizes of edible food. These forms, shapes, and sizes can be often the result of forcing the materials through a die or set of die openings and cutting or breaking into smaller segments.

Extruded ropes, sheets, shapes, or segments can be transferred to post-extrusion operations. These can include crimping, shredding, stamping, conveying, drying, cooling, and dusting in any combination or multiple of process flow. Crimping can be any process that pinches food together. Shredding is any process that reduces the size of the food upon extrusion, preferably by tearing. Stamping can be any process that embosses a surface or cuts through a food. Conveying can be used to transport food from one operation to another and can change or maintain the state of the food during transport, often being a mechanical or pneumatic process. Drying can be used to reduce process moisture to levels suitable for shelf-life in the finished product. The expanded moist pellets can be typically transported from the extruder outlet to the dryer by a conveying, airveying or augering system. After expansion and transport to the entrance to the dryer, the kibbles have typically cooled to 85-95° C. and have had the moisture reduce by evaporation from about 25-35% to about 20-28%. The temperature of the drying oven can be from about 90° C. to about 150° C. The temperature of the core pellets exiting the drying oven can be from about 90° C. to about 99° C. Dusting processes can then be performed to add carbohydrates, proteins, fats, water, vitamins, minerals, actives, and other nutritional or health benefit ingredients to the food to make an intermediate or finished product, as described in more detail hereinafter. Cooling of the food can be used to reduce the temperature from extrusion and/or drying.

An alternative drying process can be as follows. For typical pet food drying, kibble cores of about 24% moisture content enter a continuous belt dryer for a specific a dwell time to dry to about 6 to about 10% moisture content and a water activity of about 0.3 to about 0.6 when measured at about 25° C. To reduce moisture content and water activity, higher drying temperatures can be used. To further reduce moisture content and water activity, increasing the drying time can be done. Even further drying can be achieved by increasing drying time and temperature. In one embodiment, continuous drying can be achieved in single or multiple air zones and/or single or multiple pass dryers. For example, drying in multiple air zones with multiple passes can further reduce the moisture content and water activity, such as to less than about 6% moisture, or from about 1% to about 6%, and all ranges therebetween. The water activity can be reduced to less than 0.5, even less than 0.1, and can be between 0.05 to about 0.5, and all ranges therebetween. In another embodiment, batch drying can be used. Kibble bed depth, temperature, and drying time can be varied to reach a moisture content and water activity similarly as described with respect to continuous drying. In one non-limiting example, a bed depth of 3.5 inches and a temperature of 310° F. can be used to reach a water activity of 0.1. Additionally, drying belt width and belt speed can be modified.

In one embodiment, the powder can then be dusted onto the core. In one embodiment, the powder may be applied to the cores using a fluidizing paddle mixer. The core pellets can be fed to a fluidizing mixer for the application of the powder in the manufacture of a dusted pet food kibble.

In one embodiment, the fluidizing mixer can be a counter-rotating dual-axis paddle mixer, wherein the axes are oriented horizontally with paddles attached to the counter-rotating axes. A suitable counter-rotating dual-axis paddle mixer can be obtained from Forberg International AS, Larvik, Norway; Eirich Machines, Inc, Gurnee, Ill., USA, and Dynamic Air Inc., St. Paul, Minn., USA. The motion of the paddles in-between the shafts can constitute a converging flow zone, creating substantial fluidization of the particles in the center of the mixer. During operation of the mixer, the tilt of paddles on each shaft can create opposing convective flow fields in the axial directions generating an additional shear field in the converging flow zone. The downward trajectory of the paddles on the outside of the shafts can constitute a downward convective flow. Thus, in one embodiment, the fluidizing mixer has a converging flow zone located in-between the counter-rotating paddle axes.

In one embodiment, the powder can be introduced into the counter-rotating dual-axis paddle mixer such that the powder component is directed upward into the converging zone between the counter-rotating paddle axes. In one aspect, the counter-rotating dual axis paddle mixer can have a converging flow zone between the counter-rotating paddle axes and the swept volumes of the counter-rotating paddles axes do not overlap within the converging flow zone. The powder can be directed into the gap between the swept volumes of the counter-rotating paddle axes. In one aspect, the ingress of the powder into the dual-axis paddle mixer occurs through a distributor pipe located below the converging flow zone of the counter-rotating paddle axes. The distributor pipe can include at least one opening through which the powder passes into the dual-axis paddle mixer.

In one embodiment, the powder can be introduced into the counter-rotating dual-axis paddle mixer such that the powder is directed downward on top of the converging zone between the counter-rotating paddle axes.

In one embodiment, the gap between a paddle tip and fluidizing mixer wall can be greater than the largest dimension of the core pellet being dusted. While not being bound by theory, it is believed that such a gap clearance prevents the core pellets from becoming lodged between the paddle tip and the wall, possibly causing core pellet breakage.

In one embodiment the Froude number of the fluidizing paddle mixer is maintained between 0.1 and 1.5. The Froude number is defined as a dimensionless number $(Fr)=(DN^2/g)$ and relates inertial forces to those of gravity; D is the length of the paddle, N is the rotational frequency of the propeller (rev/sec), and g is the gravitational constant. The Froude number is a dimensionless number comparing inertial forces and gravitational forces. In one embodiment, the inertial forces are the centrifugal forces that are whirling the kibbles and the powder around. At too high a Froude number, the cores and the powder may be over-fluidized resulting in less efficient application of the powder to the cores. At too low a Froude number, the mixing may be too slow to effectively apply the powder to the core.

In one embodiment, the length of application of the powder to the core using a mixer can be between 1 second and 10 minutes, and all ranges of seconds therebetween. In one embodiment, application times of between 10 and 60 seconds have been found to have improved levels of adhesion of powder to the cores, although those application times are not meant to be limiting.

In general, some of the powder may not adhere to the core during the application process as described herein. In one embodiment after the application of the powder to the core, the powder that has not adhered to the core can be removed from the dusted cores by any convenient method, a non-limiting example of which is sieving. This powder can then be used for the next batch of dusting. In one embodiment, the free powder and the dusted cores can both be sent together to the next step in the manufacturing process.

In one embodiment, the electrostatic charges of the powder can be varied to affect the adhesion of the powder to the cores. By electrostatic charges is meant the deliberate addition or subtraction of electric charges to the powder and/or the cores beyond what is present during ambient conditions. Electrostatic charges can be applied to the powder and/or the cores by any convenient method. Numerous types of equipment are commercially available for applying charges to particles for dusting purposes. Non-limiting examples of such equipment are the Nordson® Encore™, or the ITW Ransburg® No. 2 Gun/Deuce Unit™. The type of charge (positive or negative) and the amount of charge can be varied depending on the materials of composition of the core and the powder, and the amount of electrostatic adhesion required.

In one embodiment, the method of application of the powder to the cores can be varied to affect the adhesion of the powder to the core. In one embodiment, the method of dispersing the powder among the kibbles can include, but is not limited to, manual application, non-limiting examples of which include sprinkling, spraying, or metering via a loss in weight feeder, auger or belt, and mixtures and combinations of these. Various types of equipment can be used to improve the dispersal and contact of the powder with the surface of the cores. Any sort of conventional solids mixer can be used for this step including, but not limited to, plough mixers, paddle mixers, fluidizing mixers, conical mixers, drum mixers, and mixtures and combinations of these. One skilled in the art of solids mixing could be able to optimize the mixing conditions based on the types of materials, particle sizes, and scale, from any one of a number of widely available textbooks and articles on the subject of solids mixing.

In one embodiment, the core, after being formed into a core but before being dusted as described herein, is not moistened. Thus, in one embodiment, the core can be at below 12% moisture content prior to, and/or during the dusting process. In another embodiment, the core is not treated in any other way to aid in adherence of the particles of the powder, except as provided for herein.

During the dusting process, in one embodiment, the core can be dusted with a first component, as described herein, such as an active as disclosed herein. The core can then be dusted, or coated, with a second component, as described herein. Additional components can be dusted, up to as many components as desired. Additionally, in one embodiment, the desired number of components can be dusted simultaneously, or in any order or timing possible. Thus, a first component and a second component can be dusted simultaneously; or a first component can be dusted for a first time period during which a second component and a third component can begin to be dusted. As one of skill in the art can see, any variation of timing and components can be envisioned.

It should additionally be understood after the dusting process occurs with any core kibble, additional layers, dustings, or even coatings can be applied as is known to those of ordinary skill in the art. Coatings of any component, such as a fat, can be provided. Other dustings, as disclosed herein, can be provided. Thus, any amount and number of coatings and dustings of components described herein and of components used in animal feed can be provided.

Grinding/Milling of Active

In one embodiment, the active ingredient, such as a Probiotic microorganism, its constituents, preservative aids, and/or stability aids, can be ground or milled into a powder for use in dusting as described herein. Any grinding machine or mill can be used. Non-limiting examples of grinding processes and/or mills that can be used include compression grinding, jet mills, air classifying mills, universal mills, pin mills, hammer mills, and even mortar and pestal.

In one embodiment, it has been found that controlling temperature during milling can assist in not affecting the active ingredient, such as a Probiotic microorganism, deleteriously. For example, in some embodiments, high temperature can result from friction during grinding or milling, and the high temperature can negatively impact the active ingredient to the point of burning up and destroying the active. For example, some grinding and/or milling processes can have a screen that the active ingredient must pass through. However, if using an active that tends to be sticky or have particular adhesion properties, the screen can become plugged with agglomerated active ingredient, which can result in the build up of friction in the mill, which in turn can produce heat that kills off the active ingredient.

In one embodiment, the milling process can result in the active ingredient reaching a temperature of less than about 65° C. In another embodiment, the active ingredient can reach a temperature of less than about 50° C. In another embodiment, the active ingredient can reach a temperature of less than about 35° C. In another embodiment, the active ingredient can reach a temperature of between about 25° C. and about 65° C. In another embodiment, the active ingredient can reach a temperature of between about 25° C. and about 50° C. In another embodiment, the active ingredient can reach a temperature of between about 25° C. and about 35° C. In another embodiment, the active ingredient can reach a temperature of between about 30° C. and about 35° C. In another embodiment, the grinding/milling is performed at ambient temperature and humidity, such as 20-25° C. and 20-30% relative humidity, respectively.

In another embodiment, the grinder or mill can be used with an air stream that helps to control temperature. In one embodiment, cool air can be blown over the active during the grinding/milling process. The cool air can be effective in preventing deleterious heat build-up of the active ingredient that results in killing off the active ingredient.

As disclosed herein, the water activity of the kibble, in some embodiments can be about 0.6 or less, 0.5 or less, 0.4 or less, 0.3 or less, 0.2 or less, and 0.1 or less. Some of these low water activities result from additional drying that is not normally used in conventional pet food kibbles. However, in some embodiments this additional drying can be utilized to ensure survival of the active ingredient, such as a Probiotic. In some embodiments, it has been found that this additional drying and thus these low water activities do not negatively impact food preference by the animal. Additionally, in some embodiments, it has been found that in fact the food preference by the animal can be increased.

Pet Food Mixture

In another embodiment, the present disclosure can provide a kibble-type pet food comprising a first kibble and a second kibble. The first kibble can comprise a source of protein of from about 16% to about 50% by weight of the first kibble, a source of fat of from about 5% to about 35% by weight of the first kibble, and a source of carbohydrate of from about 15% to about 50%. The second kibble can comprise a kibble comprising a dusted on active, such as but not limited to, a Probiotic as described hereinabove. The first kibble can be with or without an active, or with or without a dusting comprising an active.

According to these embodiments, the first kibble can be a kibble that can provide protein, fat, and carbohydrate necessary for a diet to maintain good nutrition by the animal. In certain embodiments, the first kibble can comprise a source of protein ranging from 0% up to 50% by weight of the first kibble. In other embodiments, the source of protein can range from 16% to 50% by weight, or even 20% to 50% by weight of the first kibble. It will be recognized by one of skill in the art that many kibble formulations can be used in the first kibble to provide the desired amount of additional protein, fat, and carbohydrates. In addition, the first kibble can comprise additional ingredients, such as vitamins, minerals, colorants, flavorants, and the like.

In certain embodiments, the second kibble can comprise up to 90% of the kibbles in the pet food. For example, the second kibble can comprise from 1% to 90% of the kibbles, or from 1% to 50% of the kibbles, or from 1% to 25% of the kibbles in the pet food, or from 1% to 15%, or 10%. Alternatively, the kibbles can be present in specific ratios of the first kibble to the second kibble. For example, in one embodiment of the pet food compositions of the present disclosure, the first kibble and the second kibble can be present at a ratio of at least 2:1, or at least 5:1, or at least 9:1, or at least 10:1, all by the number of kibbles present, such as the kibbles in a package. In another embodiment of the disclosure, the first kibble and the second kibble can be present at a ratio of from about 2:1 to about 50:1, or from about 5:1 to about 25:1, or from about 10:1 to about 20:1. Additionally, the pet food kibbles, in the form of a first kibble and a second kibble, can be present in weight ratios. In certain embodiments, the first kibble and the second kibble can be present at a ratio of at least 1:1, or at least 2:1, or at least 5:1, or at least 9:1, or at least 10:1, all by weight of the kibbles present, such as the kibbles in a package. In another embodiment of the disclosure, the first kibble and the second kibble can be present in a weight ratio of from about 2:1 to about 50:1, or from about 5:1 to about 25:1, or from about 10:1 to about 20:1.

In various embodiments, and as described herein, the second kibble can further comprise at least one active dusted on at least a portion of a surface of the core. For example, the at least one active dusting can comprise any of the actives described herein. In a specific embodiment the, at least one active can be a Probiotic powder, as described herein.

The pet food composition can be comprised of physically distinct components (i.e., the first kibble and the second kibble). The pet food can be provided as a variety of different presentations of the first kibble and the second kibble. For example, the pet food composition can be provided as a heterogeneous mixture of the first kibble and the second kibble. Alternatively, the first kibble and the second kibble can be provided as discretely packaged components, which can be combined in any manner or amount desired at the time of feeding. To illustrate, the pet food composition can comprise a first containing device and a second containing device, wherein the first containing device contains at least a portion of the first component and the second containing device contains at least a portion of the second component; for example, the first containing device can be a bag whereas the second containing device can be a canister. For convenience of the consumer, the bag containing at least a portion of the first component can also contain the canister containing at least a portion of the second component. Any of a variety of other presentations will be well-understood by those of ordinary skill in the art.

The pet food compositions or components thereof can be nutritionally balanced. The first kibble of the pet food compositions of the present disclosure comprises a source of protein, a source of fat, and a source of carbohydrate. Examples of a first kibble include traditional pet food kibbles. The first kibble itself can be, or may not be, nutritionally balanced. In one embodiment, the first component can be nutritionally balanced.

In one embodiment, the first kibble can comprise, on a dry matter basis, from about 20% to about 50% protein source, or from about 22% to about 40% protein, by weight of the first kibble. The protein material can comprise any material having a protein content of at least about 15% by weight, non-limiting examples of which include vegetable proteins such as soybean, cottonseed, and peanut, animal proteins such as casein, albumin, and meat tissue. Non-limiting examples of meat tissue useful herein include fresh meat, and dried or rendered meals such as fish meal, poultry meal, meat meal, bone meal, and the like. Other types of suitable crude protein sources include wheat gluten or corn gluten, and proteins extracted from microbial sources such as yeast.

The first kibble can comprise a source of fat. In one embodiment, the first kibble can comprise, on a dry matter basis, from about 5% to about 35% fat, preferably from about 10% to about 30% fat, by weight of the first component. Sources of fat are widely known, including any component comprising a source of fat, defined herein to be inclusive of, for example, wax, fat, fatty acid, and lipid. Specific examples of wax, fat, fatty acid, or lipid can often be interchangeable in accordance with nomenclature common in the art; for example, a lipid can often also be characterized as a fat. The inventors herein do not intend to be limited by any particular designation of nomenclature, and classifications of a particular material as a wax, fat, fatty acid, lipid, or the like is made for purposes of convenience only.

For example, the lipid component can comprise a fat that is a cocoa butter component or a plant oil or partially hydrogenated plant oil. Alternatively or additionally, the lipid component can comprise an animal-derived fat component. As will be commonly known in the art, the animal-derived fat component comprises a fat derived from an animal. Non-limiting examples include beef, poultry, pork, and lamb (e.g., lards and tallows). Dairy fats can also be examples, including milkfat, fractionated milkfat, and butterfat. Alternatively or additionally, the lipid component can comprise a fatty acid. Illustrative sources include omega-3 or omega-6 fatty acids. Other examples of suitable fatty acids can include oleic acid, stearic acid, palmitic acid, and lauric acids, including suitable salts thereof. Even further examples of suitable fatty acids include esters or other derivatives thereof, such as cetyl palmitate, acetic, lactic, or citric mono- and di-glyceride fatty acids, isopropyl palmitate, isopropylmyristate, and mono-, di-, and triglycerides (some of which can also be characterized as fats). Alternatively or additionally, the compositions can comprise wax. For example, illustrative waxes include paraffin wax, beeswax (e.g., white or yellow), carnuba wax, candellila wax, microcrystalline wax, rice bran wax, cetyl ester wax, and emulsifying wax.

Grains or cereals such as rice, corn, milo, sorghum, barley, alfalfa, wheat, and the like are illustrative sources of carbohydrate. These carbohydrate sources, and typical levels thereof, are widely known in traditional pet food compositions.

The present compositions can be used to deliver benefit following oral consumption in animals, such as a pet. This benefit generally maintains and improves the overall health of the animal. Non-limiting elements of animal health and physiology that benefit, either in therapeutically relieving the symptoms of, or disease prevention by prophylaxis, or improvement of overall health, including treatment of the immune system, treatment of the gastrointestinal system, treatment of skin or coat, treatment of stress, and mixtures and combinations thereof. Non-limiting examples include inflammatory disorders, immunodeficiency, inflammatory bowel disease, irritable bowel syndrome, cancer (particularly those of the gastrointestinal and immune systems), otitis externa, diarrheal disease, antibiotic associated diarrhea, appendicitis, autoimmune disorders, multiple sclerosis, Alzheimer's disease, amyloidosis, rheumatoid arthritis, arthritis, joint mobility, hip dysplasia, diabetes mellitus, insulin resistance, bacterial infections, viral infections, fungal infections, periodontal disease, urogenital disease, idiopathic cystitis, interstitial cystitis, surgical associated trauma, surgical-induced metastatic disease, sepsis, weight loss, weight gain, excessive adipose tissue accumulation, anorexia, fever control, cachexia, wound healing, ulcers, gut barrier infection, allergy, asthma, respiratory disorders, circulatory disorders, coronary heart disease, anemia, disorders of the blood coagulation system, renal disease, disorders of the central nervous system, hepatic disease, ischemia, nutritional disorders, treatment or prevention of disorders involving the hypothalamus-pituitary-adrenal (HPA) axis, osteoporosis, endocrine disorders, and epidermal disorders. Treatment includes treatment of the gastrointestinal tract, including treatment or prevention of diarrhea; immune system regulation, preferably the treatment or prevention of autoimmune disease and inflammation, maintaining or improving the health of the skin and/or coat system, preferably treating or preventing atopic disease of the skin (e.g., dermatitis or eczema), treatment or prevention of disorders involving the hypothalamus-pituitary-adrenal (HPA) axis, ameliorating or reducing the effects of aging, including mental awareness and activity levels, and preventing weight loss during and following infection. Treatment of the various disorders described herein can be measured using techniques known to those of ordinary skill in the art, for example, those methods of measurement disclosed in U.S. Published Application No. US 2006/0228448A1.

EXAMPLES

Water Activity Over Time

A kibbled dog food coated with paraffin and Probiotics was packed in a 20 lb plastic bag made of a plastic laminate of an outer layer of polyethylene teraphthalate (PET) and an inner layer of a co-extruded blend of linear low density polyethylene, medium density polyethylene, and linear low density polyethylene. The bag had a permeability coefficient of about $6 \times 10^{-6}$ g*ply/d/cm$^2$/mmHg. The dog food with packed at an initial water activity of 0.037, moisture content of 3.31%, and with a Probiotic activity level of $2.54 \times 10^9$ CFU/gram of kibble. After five weeks, the water activity increased to 0.228, Probiotic activity level decreased to $1.15 \times 10^9$ CFU/gram of kibble, and the moisture content increased to 4.99%. The environment was 40° C. and 80% relative humidity.

Lifecycle Example

A small breed dog food was dusted with Probiotics at about $10^{10}$ CFU/gram kibble and was packed in 20 lb plastic bags made of a plastic laminate of an outer layer of polyethylene teraphthalate (PET) and an inner layer of a co-extruded blend of linear low density polyethylene, medium density polyethylene, and linear low density polyethylene. The bag had a permeability coefficient of about $6 \times 10^{-6}$ g*ply/d/cm²/mmHg. The dog food was packed at an initial water activity of 0.10. The bags were stored at a warehouse for 14 days at 30° C. and 65% relative humidity. The water activity of the dog food was then 0.10. The bags were then transported in a shipping truck for seven days at 38° C. and 65% relative humidity. The water activity of the dog food was then 0.11. The bags were then stored at a distribution center for 35 days at 30° C. and 65% relative humidity. The water activity of the dog food was then 0.15. The bags were then transported in a shipping truck for seven days at 38° C. and 65% relative humidity. The water activity of the dog food was then 0.16. The bags were then stored in the storage area of a retailer for 14 days at 22° C. and 35% relative humidity. The water activity was then 0.17. The bags were then sitting on the retailer's shelf for 14 days at 22° C. and 35% relative humidity. The final water activity was then 0.28.

Desiccant Example

FIGS. 1-4 show the water activity (Aw) effect of using three types of desiccants (clay, sieve, and silica) purchased from Desiccare, Inc. Three different levels of each desiccant were used. The animal food used was a commercial small breed dog food that was transferred into 20 lb plastic bags made of a plastic laminate of an outer layer of polyethylene teraphthalate (PET) and an inner layer of a co-extruded blend of linear low density polyethylene, medium density polyethylene, and linear low density polyethylene. The bag had a permeability coefficient of about $6 \times 10^{-6}$ g*ply/d/cm²/mmHg and had a with a zip closure. Each bag, on top of 20 lbs dog food, contained a) 1 lb, 2.5 lbs, or 5 lbs clay desiccant; b) 1 lb, 2 lbs, or 4 lbs of silica gel desiccant; c) 1 lb, 2.2 lbs, or 4.4 lbs of molecular sieve desiccant. The desiccant was mixed with the product and was in direct contact with the kibbles. Desiccants were not contained in any protective bags or sachets. The bag of dog food was stored at ambient temperature and humidity of approximately 70-75° F. and 30-35% relative humidity. Each bag was opened and a sample was pulled every week. After each sampling the bag was closed and placed back into the ambient storage.

FIG. 1 shows Aw lowering potential of a clay desiccant. The biggest uptake of moisture by clay desiccant occurred in the first 2-3 weeks of storage with lowering of Aw by 28% (2.2 lb of clay). The reduction continued over time reaching steady state between 9 and 12 weeks. The total Aw reduction at the end of 12 weeks reached 50% for 5 lb of clay and 38% for 2.2 lbs of clay lowering the Aw from 0.6 to 0.29 (5 lbs of clay) and to 0.37 (2.2 lbs of clay).

Figure 2:
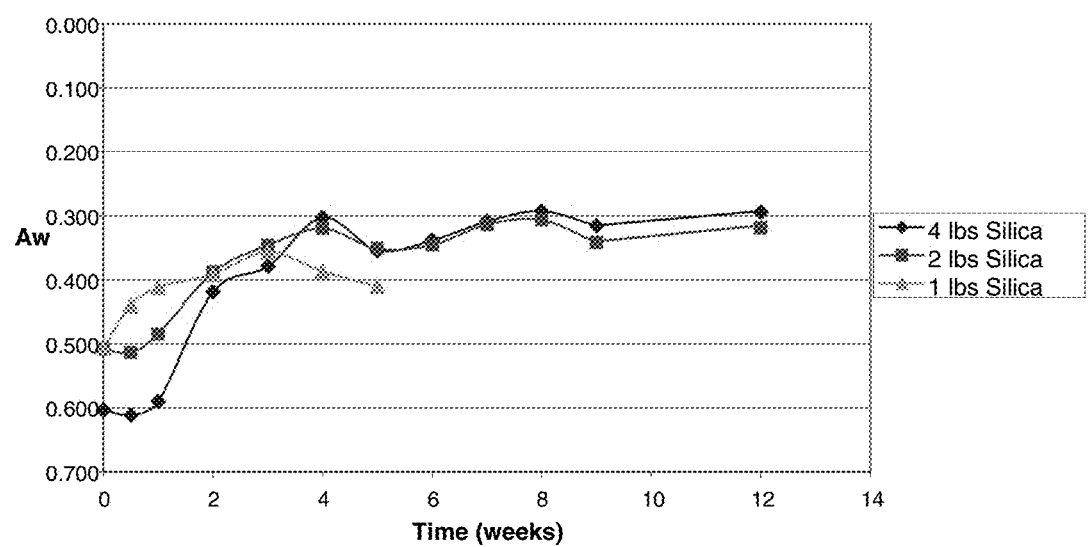
FIG. 2 shows the water activity (Aw) effect of using a desiccant in accordance with one embodiment of the present invention.

FIG. 2 shows Aw lowering potential of silica desiccant. The biggest uptake of moisture by silica desiccant occurred in the first 3 weeks of storage with lowering of Aw by 37% and 32% with 4 lbs and 2 lbs of silica, respectively. The reduction continued over time reaching steady state between 8 and 12 weeks. The total Aw reduction for 4 lbs and 2 lbs of silica reached 51% and 37% respectively at the end of 12 weeks.

Figure 3:
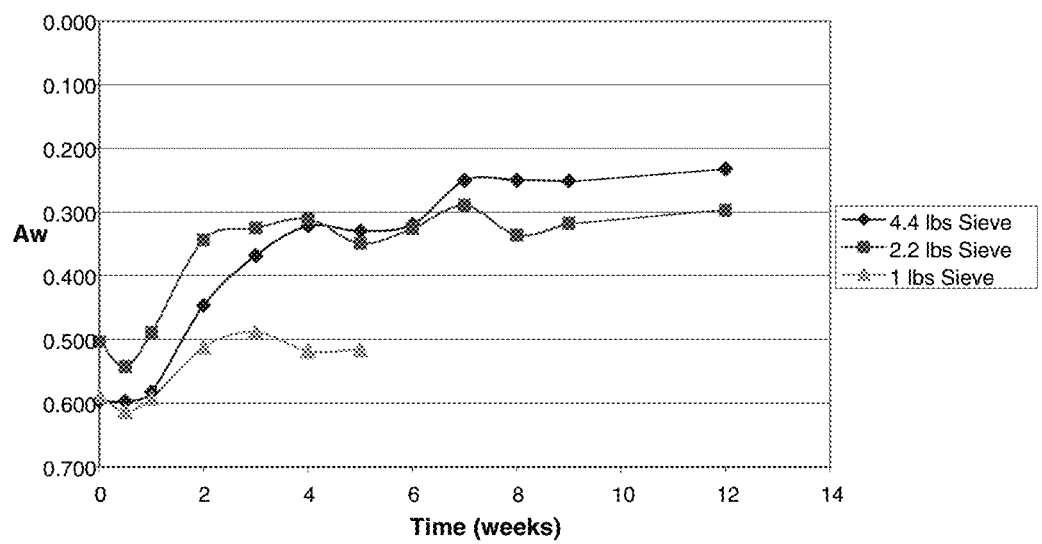
FIG. 3 shows the water activity (Aw) effect of using a desiccant in accordance with one embodiment of the present invention.

FIG. 3 shows Aw lowering potential of molecular sieve desiccant. The biggest uptake of moisture by molecular sieve desiccant occurred in the first 3 weeks of storage with lowering of Aw by 38% and 35% with 4.4 lbs and 2.2 lbs of molecular sieve, respectively. The reduction continued over time reaching steady state between 8 and 12 weeks. The total Aw reduction for 4.4 lbs and 2.2 lbs sieve reached 61% and 41% respectively at the end of 12 weeks.

Figure 4:
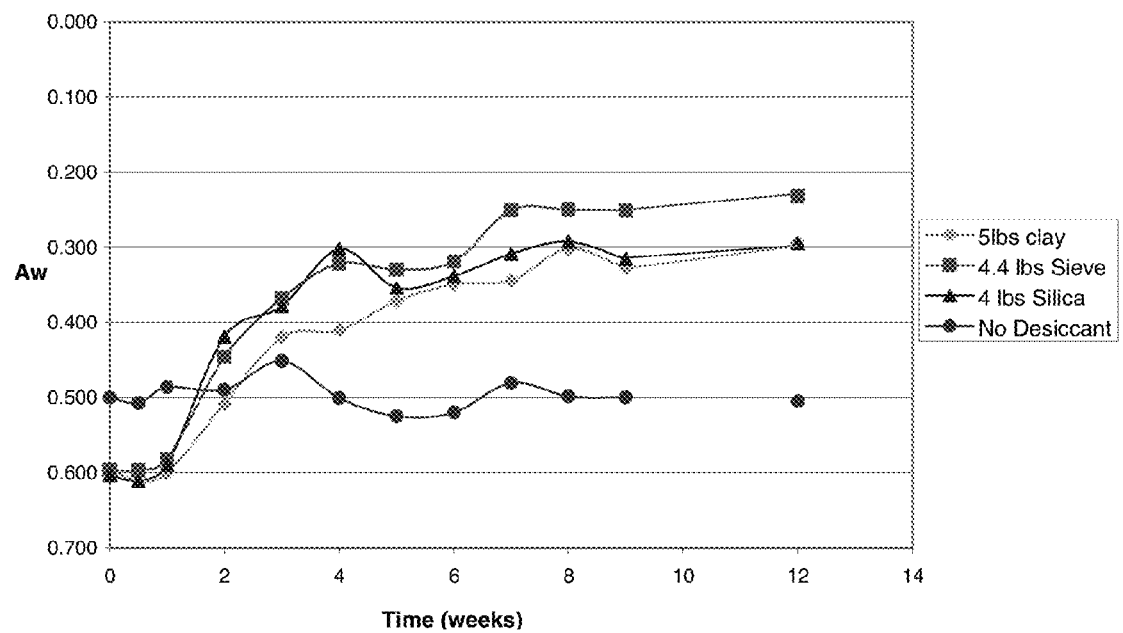
FIG. 4 shows the water activity (Aw) effect of using a desiccant in accordance with one embodiment of the present invention.

FIG. 4 shows a direct comparison between the desiccants at their corresponding most effective level. The graph indicates that the fastest initial Aw lowering can be achieved with silica desiccant (31% reduction) in the first 2 weeks of storage followed by sieve (25% reduction) and clay (14% reduction). Sieve shows the best overall performance over time with 61% reduction in Aw in 12 weeks.

Figure 5:
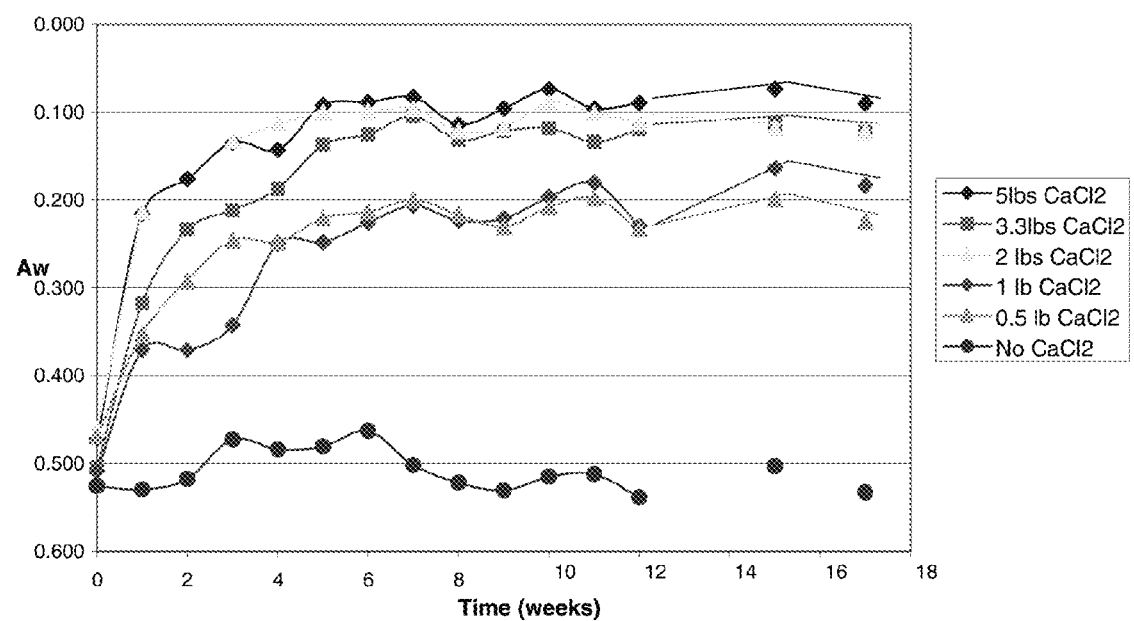
FIG. 5 shows the water activity (Aw) effect of using a desiccant in accordance with one embodiment of the present invention.

For FIG. 5, a commercial small breed dog food was also used. It was dusted with Probiotic microorganisms at about $10^{10}$ CFU/gram of kibble and transferred into plastic bags made of a plastic laminate of an outer layer of polyethylene teraphthalate (PET) and an inner layer of a co-extruded blend of linear low density polyethylene, medium density polyethylene, and linear low density polyethylene. The bag had a permeability of about $6 \times 10^{-6}$ g*ply/d/cm²/mmHg and had a with a zip closure. To each bag of 20 lbs dog food was added a different amount of $CaCl_2$ (5 lbs, 3.3 lbs, 2 lbs, 1 lb, or 0.5 lb), and the bags were closed and stored at room temperature. Samples were pulled from each bag periodically and submitted for moisture and Aw. In this example, bulk $CaCl_2$ was used and in was in direct contact with the kibbles.

METHODS

Particle Size

When determining particle size, the particle size can be defined as the particle size as measured by laser diffraction analysis, such as by International Organization for Standardization (ISO) method 13320.

For particles of irregular shape and dimension, particle size can be defined as measured by way of mesh screens using ASTM E 11-70 (1995).

Water Activity

Water activity may be determined using methods known to those skilled in the art. Water activity can be determined using a NovaSina TH200 Water Activity Meter at 25° C. or other suitable device as is known in the art. Briefly, the meter is calibrated using calibration salts. The sample to be measured is temperature equilibrated in the meter, following which the water activity is determined as the percent relative humidity (% RH) divided by 100 after equilibrium is reached (typically 10 to 20 minutes).

Activity of Probiotic

The test method of determining the activity level of Probiotics in animal food can be performed as follows.

Sample Preparation: Into a sterile stomach bag (commercially available from Interscience Laboratories Inc., Weymouth, Mass.), the sample for measurement is aseptically weighed, and the weight is recorded. The sample is diluted by adding room temperature Butterfield's Phosphate Buffered Dilution Water (Bacteriological Analytical Manual, $8^{th}$ Edition) until at a 1:10 dilution (meaning, if sample weighs 3 grams, add buffer until the scale reads 30 grams). The sample is allowed to soften for about 20 to 30 minutes, then it is flattened and broke into small pieces, then place into a MINI-MIX stomacher (commercially available from Interscience Laboratories Inc., Weymouth, Mass.) for two minutes at a speed of 9.

Sample Dilution: Upon completion of stomaching, 1 milliliter of the mixed sample is transferred into a 9 milliliter dilution tube containing Butterfield's Phosphate Buffered Dilution Water (making a −2 dilution). Serial dilute the sample by transferring 1 milliliter from the −2 dilution into a different 9 milliliter dilution tube (making a −3 dilution). This step is repeated until the desired dilution for plating has been reached. Each tube is vortexed prior to performing the next dilution.

Sample Plating: The sample is plated in duplicate on Difco Lactobacilli MRS Agar (DeMan, Rogosa and Sharpe Agar) at −6, −7, and −8 dilutions. To plate the dilution of −8, 0.1 milliliters from the −7 dilution tube is transferred onto a room temperature MRS plate. Appropriate dilutions are repeated, vortexing the tube immediately prior to plating. Samples are spread evenly over the entire surface of the plate, using a sterile spreader. Plates are positioned, inverted, in a 7 liter anaerobic jar (Mitsubishi). An anaerobic indicator (Oxoid) is placed inside the jar. Three AnaeroPack (Mitsubishi) sachets are obtained and opened, with one sachet in one side compartment and two sachets in the other side compartment. The lid is placed on top of the jar and a good seal is ensured. The anaerobic jar is placed in an incubator at 37° C.±2° C. for a 48 hour incubation period.

Probiotic Microorganism Enumeration: After incubating for 48 hours, the plates are removed from the incubator and typical bacterial colonies are counted manually using a Quebec Colony Counter to magnify the colonies. Plates are enumerated in the range of 25-250 colonies. Once a raw count (number of colonies counted on the plate) is completed, the dilution is accounted for; therefore, the raw count is multiplied by the reciprocal of the dilution to provide CFU/gram of sample.

Permeability

The Permeability (P) of a material is calculated from:

$$\frac{\Delta m_{gas}}{\Delta t} = P\frac{A\Delta p}{L} \text{ or } P = \frac{\Delta m_{gas} L}{\Delta t A \Delta p} \quad (1)$$

Where:
P=Permeability coefficient of the barrier material
$\Delta m/\Delta t$=water vapor transmission rate (mass of water vapor per time)
A=area of barrier
L=thickness of the barrier
$\Delta p$=partial pressure difference across the barrier The partial pressure of water ($p(H_2O)$) is determined from the relative humidity (% RH) and the vapor pressure of water ($p^*(H2O)_T$) at the given temperature:

$$p(H_2O) = (\% RH)(p^*(H_2O)) \quad (2)$$

Thus, the permeability coefficients for the packaging materials/barrier layers are found by substituting the measured mass transmission rate, the calculated partial pressure difference, and the barrier's physical dimensions into equation (1) above. For the above equation, the water vapor transmission rate was measure by using a modified version of the Payne Cup method. Water loss through the barrier material of the package was measured gravimetrically over time, under known, constant temperature and humidity conditions. The interior of the system was kept at 85% relative humidity by use of a saturated KCl solution, and the outside of the system was kept at 10% relative humidity using an Envirotronics Model FLX300-1-2-AC-H environmental chamber. The temperature was 25° C., also maintained by the environmental chamber.

Additional methods of measuring the water vapor transmission rate are well known to those of skill in the art, including ASTM Method F-1249, ASTM Method E-96, ASTM Method F-372, ASTM Method F-1770, and ASTM Method DIN-53122, as non-limiting examples.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of providing an animal food having an active ingredient, comprising:
providing a nutritionally balanced animal food comprising an active ingredient, wherein the animal food is a kibble comprising a core and a dusting on the core, the dusting comprising the active ingredient and wherein the dusting contains less than 5 parts per million of the dusting of a binding agent, and the kibble comprises from 25% to 75% by weight of the dusting, and wherein the dusting adheres to the core through electrostatic adhesion;
providing a package having a permeability of no more than $10^{-5}$ grams/day/cm$^2$/mmHg;
packing the animal food into the package;
wherein the animal food has a water activity of less than 0.3 when packed;
wherein the package is formed from a plastic laminate selected from the group consisting of ethylene-derived polymers, polypropylene, polyester, teraphthalates, polyolefins, homopolymer and/or co-polymer polyolefins, woven polypropylene, and mixtures and combinations thereof, and is effective at maintaining the activity of the active ingredient to no less than 90% of the initial activity level after 6 months of packing.

2. The method of claim 1 further comprising providing a desiccant within the package, wherein the desiccant is effective at keeping the animal food at less than a water activity of 0.3 or at lowering the water activity of the animal food.

3. The method of claim 2 wherein the desiccant comprises a mixture of silica and a desiccant selected from the group consisting of molecular sieve and calcium chloride.

4. The method of claim 1 wherein the active ingredient comprises an active selected from the group consisting of sources of fiber ingredients, mineral ingredients, polyphenol ingredients, amino acid ingredients, carotenoid ingredients, antioxidant ingredients, fatty acid ingredients, glucose mimetic ingredients, prebiotic ingredients, enzymes, antibodies, immunoglobulins, cytokines, epigenetic agents, vitamins, and probiotic microorganisms, and mixtures and combinations thereof.

5. The method of claim 1, wherein the dusting comprises at least a second active ingredient.

6. A method of providing an animal food having a probiotic, comprising:
providing a nutritionally balanced animal food comprising a probiotic, wherein the animal food is a kibble comprising a core and a dusting on the core, the dusting comprising the probiotic and wherein the dusting contains less than 5 parts per million of the dusting of a binding agent, and the kibble comprises from 25% to 75% by weight of the dusting, and wherein the dusting adheres to the core through electrostatic adhesion;

providing a package having a permeability of no more than $10^{-5}$ grams/day/cm$^2$/mmHg;

packing the animal food into the package;

wherein the animal food has a water activity of less than 0.3 when packed;

wherein the package is formed from a plastic laminate selected from the group consisting of ethylene-derived polymers, polypropylene, polyester, teraphthalates, polyolefins, homopolymer and/or co-polymer polyolefins, woven polypropylene, and mixtures and combinations thereof, and is effective at preventing the probiotic from losing more than two logs after 6 months of packing.

7. The method of claim 6 further comprising providing a desiccant within the package, wherein the desiccant is effective at keeping the animal food at less than a water activity of 0.3 or at lowering the water activity of the animal food.

8. The method of claim 7 wherein the desiccant comprises a mixture of silica and a desiccant selected from the group consisting of molecular sieve and calcium chloride.

9. The method of claim 6 wherein the probiotic component comprises a lyophilized bifidobacteria that is not a spore former and is not a *lactobacillus*.

10. The method of claim 6 wherein the probiotic component comprises NCIMB 41199.

11. The method of claim 6 wherein the probiotic is packed at an activity level of at or less than $10^{10}$ CFU/gram of animal food.

12. The method of claim 6 wherein the probiotic has an activity level of at least $10^6$ CFU/gram of animal food after 16 months.

13. The method of claim 6 wherein at least a portion of the probiotic components have a particle size of between 10 microns and 75 microns.

14. The method of claim 6, wherein the plastic laminate is selected from the group consisting of ethylene-derived polymers in combination with teraphthalates.

15. The method of claim 6, wherein the plastic laminate comprises a nylon film laminated on polyethylene.

16. The method of claim 6, wherein the plastic laminate comprises an outer layer of polyethylene teraphthalate and an inner layer of a co-extruded blend of linear low density polyethylene and medium density polyethylene.

17. The method of claim 6, wherein the package further comprises a protective layer comprising wax, paraffin, fats, or mixtures or combinations thereof.

* * * * *